(12) United States Patent
Xie et al.

(10) Patent No.: US 8,941,596 B2
(45) Date of Patent: Jan. 27, 2015

(54) TOUCH SCREEN, COLOR FILTER SUBSTRATE AND MANUFACTURING METHODS THEREOF

(75) Inventors: Zhenyu Xie, Beijing (CN); Xu Chen, Beijing (CN); Xiang Liu, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 739 days.

(21) Appl. No.: 12/782,218

(22) Filed: May 18, 2010

(65) Prior Publication Data

US 2010/0295807 A1    Nov. 25, 2010

(30) Foreign Application Priority Data

May 19, 2009    (CN) .......................... 2009 1 0084762

(51) Int. Cl.
*G06F 3/041*    (2006.01)
*G06F 3/045*    (2006.01)

(52) U.S. Cl.
CPC .............. *G06F 3/045* (2013.01); *G06F 3/0414* (2013.01)
USPC ........................................................ 345/173

(58) Field of Classification Search
CPC ...... G06F 3/041; G06F 3/0412; G06F 3/0414
USPC ........................................................ 345/173
See application file for complete search history.

(56) References Cited

U.S. PATENT DOCUMENTS

| | | | |
|---|---|---|---|
| 4,328,441 A * | 5/1982 | Kroeger et al. | ............... 310/319 |
| 5,729,034 A | 3/1998 | Park | |
| 7,339,564 B2 | 3/2008 | Hashimoto et al. | |
| 2008/0018613 A1 | 1/2008 | Kim et al. | |
| 2008/0158199 A1 | 7/2008 | Lee et al. | |
| 2008/0174851 A1 | 7/2008 | Kawai | |
| 2009/0179523 A1* | 7/2009 | Wang et al. | .................... 310/338 |
| 2009/0262096 A1* | 10/2009 | Teramoto | ...................... 345/174 |
| 2009/0322702 A1* | 12/2009 | Chien et al. | ................... 345/174 |
| 2010/0194697 A1 | 8/2010 | Hotelling et al. | |
| 2010/0321327 A1 | 12/2010 | Liu | |

FOREIGN PATENT DOCUMENTS

| | | |
|---|---|---|
| CN | 101158764 A | 4/2008 |
| CN | 101201525 A | 6/2008 |
| CN | 101276252 A | 10/2008 |

OTHER PUBLICATIONS

USPTO RR dated Jun. 20, 2013 in connection with U.S. Appl. No. 12/879,185.

(Continued)

*Primary Examiner* — Stephen Sherman
*Assistant Examiner* — Randal Willis
(74) *Attorney, Agent, or Firm* — Ladas & Parry LLP

(57) ABSTRACT

A touch screen and a manufacturing method thereof, and a color filter substrate and a manufacturing method thereof are provided in the invention. The touch screen comprises a substrate, a plurality of touch regions defined by a plurality of first signal lines and a plurality of second signal lines are provided on the substrate. In each touch region, the first signal line is connected with a first piezoelectric switch, the second signal line is connected with a second piezoelectric switch, when the touch region is touched by a force the first piezoelectric switch and the second piezoelectric switch are turned on and transfer voltage signals respectively via the first signal line and the second signal line to determine the coordinate of the touched touch region.

10 Claims, 14 Drawing Sheets

(56) References Cited

OTHER PUBLICATIONS

USPTO NFOA dated Aug. 30, 2013 in connection with U.S. Appl. No. 12/879,185.

USPTO FOA dated Dec. 20, 2013 in connection with U.S. Appl. No. 12/879,185.

USPTO NFOA dated Nov. 20, 2014 in connection with U.S. Appl. No. 12/879,185.

* cited by examiner

C2 - C2

A4 - A4

TOUCH SCREEN, COLOR FILTER SUBSTRATE AND MANUFACTURING METHODS THEREOF

BACKGROUND

Embodiments of the present invention relate to a touch screen and a manufacturing method thereof, and a color filter substrate and a manufacturing method thereof.

According to operation principles, the conventional touch screens can be sorted into a inductance type, a capacitance type, a resistance type and the like. The resistance type touch screen is controlled by pressure induction and mainly comprises a resistance thin film that is closely attached to the surface of the display. During the operation process, the resistance thin film and the display cooperate with each other. When the coordinates of the touch point on the display is determined, the intention of the user can accordingly be determined on basis of the displayed content or image corresponding to the above coordinates. At present, the conventional resistance type touch screen for the liquid crystal display mainly comprises a four-wire resistance type touch screen and a five-wire resistance type touch screen.

A four-wire resistance type touch screen comprises a composite film of four layers. An outer layer on the lower side is a glass plate or a hard plastic plate that is used as a base layer; an inner layer on the lower side is a transparent conductive film (such as ITO) applied on the inner surface of the base layer; an outer layer on the upper side is a plastic layer for preventing the surface from aging or being scratched; and an inner layer on the upper side is a transparent conductive film applied on the inner surface of the plastic layer. There are a plurality of fine particles for separating the two transparent conductive films. The two transparent conductive films are used as the working faces of the touch screen. A silver strip is respectively applied on both ends of each working face, so that a pair of electrodes is formed for each working face. The pair of electrodes of one working face are perpendicular to those of the other working face. In the case that a voltage is applied on the pair of electrodes of one working face, a parallel voltage distribution uniformly and continuously occurs on this working face. If a user's finger touches the plastic layer on the outer surface, the two transparent conductive films originally insulated from each other contact with each other at the touch point. When a predetermined voltage is applied on the pair of the electrodes extending in a certain direction (such as the X axis direction), while no voltage is applied on the pair of electrodes extending in the other direction (such as the Y axis direction), the voltage value at the touch point in the parallel electric field generated by the pair of electrodes in the X axis direction is exhibited on the pair of electrodes in the Y axis direction. By measuring the voltage value of the pair of electrodes in the Y axis direction, the coordinate of the touch point in the X axis direction can be determined. Similarly, when a predetermined voltage is applied on the pair of electrodes extending in the Y axis direction while no voltage is applied on the pair of electrodes extending in the X axis direction, by measuring the voltage value of the pair of electrodes in the X axis direction, the coordinate of the touch point in the Y axis direction can be determined.

A five-wire resistance type touch screen is also a composite film of four layers. Specifically, a precise resistance network for forming voltage fields in two directions is formed on the glass plate (i.e. the outer layer on the lower side), and a conductive layer of NiAu, which is merely used as a conductor, is formed on the plastic layer (i.e. the outer layer on the upper side). In addition, in the five-wire resistance type touch screen, the voltage fields in two directions are applied on the same working face in a time division way. When the surface is touched, the voltage values in the X axis and the Y axis at the touch point are detected in a time division way, and then the coordinate of the touch point is determined. In the five-wire resistance type touch screen, four wires are led from the working face and one wire is led from the conductor face, thus five wires are led from such structure.

SUMMARY

According to an embodiment of the invention, a touch screen is provided. The touch screen comprises a substrate, a plurality of touch regions defined by a plurality of first signal lines and a plurality of second signal lines are provided on the substrate. In each touch region, the first signal line is connected with a first piezoelectric switch, the second signal line is connected with a second piezoelectric switch, when the touch region is touched by a force, the first piezoelectric switch and the second piezoelectric switch are turned on and transfer voltage signals respectively via the first signal line and the second signal line to determine the coordinate of the touched touch region.

According to another embodiment of the invention, a method of manufacturing a touch screen is provided. The method comprises:

Step 11 of depositing a piezoelectric film on a substrate and forming a first active layer and a second active layer by a patterning process;

Step 12 of forming a first signal line, a first electrode, a second signal line and a second electrode on the substrate after the Step 11, wherein both of the first signal line and the first electrode are connected with the first active layer, a channel region of a first piezoelectric switch is formed between the first electrode and the first signal line, both of the second signal line and the second electrode are connected with the second active layer, and a channel region of a second piezoelectric switch is formed between the second electrode and the second signal line;

Step 13 of depositing an insulating layer on the substrate after the Step 12 and forming a first via hole and a second via hole therein by a patterning process, wherein the first via hole is provided over the first electrode and the second via hole is provided over the second electrode; and Step 14 of depositing a conductive thin film on the substrate after the Step 13 and forming a working electrode by a patterning process, wherein the working electrode is connected with the first electrode through the first via hole and with the second electrode through the second via hole.

According still another embodiment of the invention, a color filter substrate is provided in the invention. A color filter substrate comprises a substrate, a color filter structure layer and a touch structure layer for determining the coordinate of the touch point are provided on the substrate, a plurality of pixel regions defined by a plurality of first signal lines and a plurality of second signal lines are provided in the touch structure layer. In each of the pixel regions, the first signal line is connected with a first piezoelectric switch, the second signal line is connected with a second piezoelectric switch, when the pixel region is touched by a force the first piezoelectric switch and the second piezoelectric switch are turned on and transfer voltage signals respectively via the first signal line and the second signal line to determine the coordinate of the touched pixel region.

According to still another embodiment of the invention, a method of manufacturing a color filter substrate is provided in the invention. The method comprises:

Step 21 of sequentially depositing a first metal film and a piezoelectric film on a substrate and forming a first active layer and a second active layer by a patterning process, wherein a light-blocking layer is formed below the first active layer and the second active layer;

Step 22 of depositing a second metal film on the substrate after the Step 21 and forming a first signal line, a first electrode, a second signal line and a second electrode by a patterning process, wherein the first signal line integrally and continuously extends and is provided on the first active layer, the first electrode is also provided on the first active layer so that a channel region of a first piezoelectric switch is formed between the first electrode and the first signal line, the second signal line discontinuously extends and is provided on the second active layer, two segments of the second signal line are formed on two sides of the first signal line, and the second electrode is also provided on the second active layer so that a channel region of a second piezoelectric switch is formed between the second electrode and the second signal line;

Step 23 of forming a color resin layer on the substrate after the Step 22 and forming a third via hole and a fourth via hole therein by a patterning process, wherein the third via hole and the fourth via hole are respectively provided at both end portions of each segment of the second signal line;

Step 24 of depositing a third metal film on the substrate after the Step 23 and forming a connection electrode by a patterning process, wherein the segments of the second signal line are connected with each other by the connection electrode through the third via hole and the fourth via hole;

Step 25 of depositing a first insulating layer on the substrate after the Step 24 and forming a first via hole and a second via hole therein by a patterning process, wherein the first via hole is provided over the first electrode, the first insulating layer and the color resin layer in the first via hole are removed to expose the surface of the first electrode, the second via hole is provided over the second electrode, and the first insulating layer and the color resin layer in the second via hole are removed to expose the surface of the second electrode; and Step 26 of depositing a conductive thin film on the substrate after the Step 25 and forming a working electrode by a patterning process, wherein the working electrode is connected with the first electrode through the first via hole and with the second electrode through the second via hole.

According to still another embodiment of the invention, a method of manufacturing a color filter substrate is provided in the invention. The method comprises:

Step 31 of sequentially depositing a first metal film and a piezoelectric film on a substrate and forming a first active layer and a second active layer by a patterning process, wherein a light-blocking layer is formed below the first active layer and the second active layer;

Step 32 of depositing a second metal film on the substrate after the Step 31 and forming a first signal line, a first electrode, a second signal line and a second electrode by a patterning process, wherein the first signal line integrally and continuously extends and is provided on the first active layer, the first electrode is also provided on the first active layer so that a channel region of a first piezoelectric switch is formed between the first electrode and the first signal line, the second signal line discontinuously extends and is provided on the second active layer, two segments of the second signal line are formed on two sides of the first signal line, and the second electrode is also provided on the second active layer so that a channel region of a second piezoelectric switch is formed between the second electrode and the second signal line;

Step 33 of depositing a first insulating layer on the substrate after the Step 32 and forming a third via hole and a fourth via hole therein by a patterning process, wherein the third via hole and the fourth via hole are respectively provided at both end portions of each segment of the second signal line;

Step 34 of depositing a third metal film on the substrate after the Step 33 and forming a connection electrode by a patterning process, wherein the segments of the second signal line are connected with each other by the connection electrode through the third via hole and the fourth via hole;

Step 35 of forming a color resin layer on the substrate after the Step 34 and forming a first via hole and a second via hole therein by a patterning process, wherein the first via hole is provided over the first electrode, the color resin layer and the first insulating layer in the first via hole are removed to expose the surface of the first electrode, the second via hole is provided over the second electrode, and the color resin layer and the first insulating layer in the second via hole are removed to expose the surface of the second electrode; and Step 36 of depositing a conductive thin film on the substrate after the Step 35 and forming a working electrode by a patterning process, wherein the working electrode is connected with the first electrode through the first via hole and with the second electrode through the second via hole.

According to still another embodiment of the invention, a method of manufacturing a color filter substrate is provided in the invention. The method comprises:

Step 41 of forming a color resin layer on a substrate;

Step 42 of sequentially depositing a first metal film and a piezoelectric film on the substrate after the Step 41 and forming a light-blocking layer, a first active layer and a second active layer by a patterning process, wherein the light-blocking layer is formed below the first active layer and the second active layer;

Step 43 of depositing a second metal film on the substrate after the Step 42 and forming a first signal line, a first electrode, a second signal line and a second electrode by a patterning process, wherein the first signal line integrally and continuously extends and is provided on the first active layer, the first electrode is also provided on the first active layer so that a channel region of a first piezoelectric switch is formed between the first electrode and the first signal line, the second signal line discontinuously extends and is provided on the second active layer, two segments of the second signal line are formed on two sides of the first signal line, and the second electrode is also provided on the second active layer so that a channel region of a second piezoelectric switch is formed between the second electrode and the second signal line;

Step 44 of depositing a first insulating layer on the substrate after the Step 43 and forming a third via hole and a fourth via hole therein by a patterning process, wherein the third via hole and the fourth via hole are respectively provided at both end portions of each segment of the second signal line;

Step 45 of depositing a third metal film on the substrate after the Step 44 and forming a connection electrode by a patterning process, wherein the segments of the second signal line are connected with each other by the connection electrode through the third via hole and the fourth via hole;

Step 46 of depositing a second insulating layer on the substrate after the Step 45 and forming a first via hole and a second via hole therein by a patterning process, wherein the first via hole is provided over the first electrode, the second insulating layer and the first insulating layer in the first via hole are removed to expose the surface of the first electrode, the second via hole is provided over the second electrode, and the second insulating layer and the first insulating layer in the second via hole are removed to expose the surface of the second electrode; and Step 47 of depositing a conductive thin film on the substrate after the Step 46 and forming a working electrode by a patterning process, wherein the working electrode is connected with the first electrode through the first via hole and with the second electrode through the second via hole.

According to still another embodiment of the invention, a method of manufacturing a color filter substrate is provided in the invention. The method comprises:

Step 51 of forming a color resin layer on a substrate;

Step 52 of sequentially depositing a first metal film and a piezoelectric film on the substrate after the Step 51 and forming a first active layer and a second active layer by a patterning process, wherein a light-blocking layer is formed below the first active layer and the second active layer;

Step 53 of forming a first signal line, a first electrode, a second signal line and a second electrode on the substrate after the Step 52, wherein both the first signal line and the first electrode are connected with the first active layer, a channel region of a first piezoelectric switch is formed between the first electrode and the first signal line, both of the second signal line and the second electrode are connected with the second active layer, and a channel region of a second piezoelectric switch is formed between the second electrode and the second signal line;

Step 54 of depositing an insulating layer on the substrate after the Step 53, and forming a first via hole and a second via hole therein by a patterning process, wherein the first via hole is provided over the first electrode, and the second via hole is provided over the second electrode; and Step 55 of depositing a conductive thin film on the substrate after the Step 54 and forming a working electrode by a patterning process, wherein the working electrode is connected with the first electrode through the first via hole and with the second electrode through the second via hole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE EMBODIMENTS

Hereinafter, the invention will be described in detail with reference to the following embodiments and the accompanying drawings.

Figure 1:
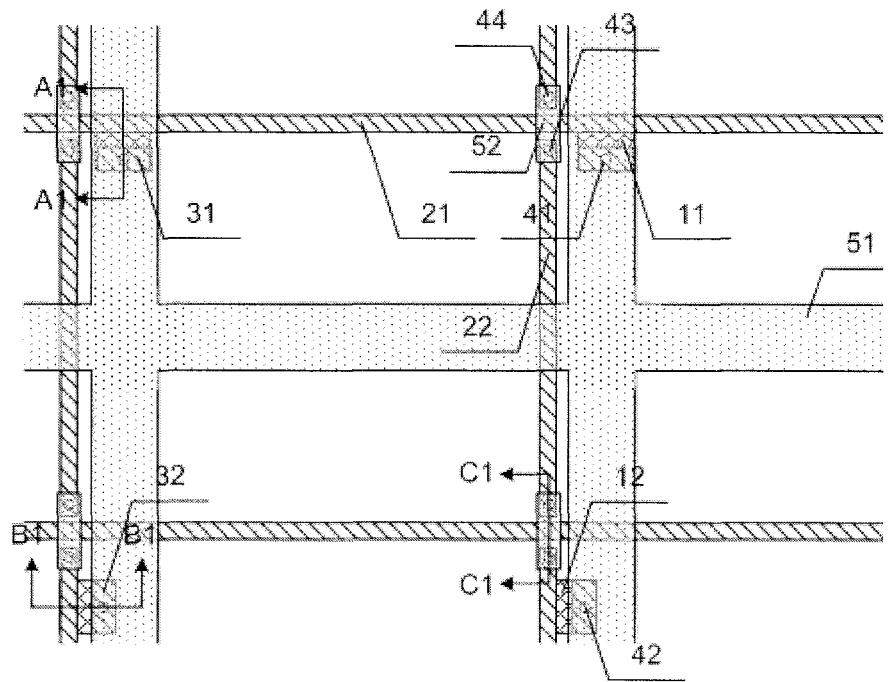
FIG. 1 is a schematic view showing a first embodiment of a touch screen according to the invention.
Figure 2:
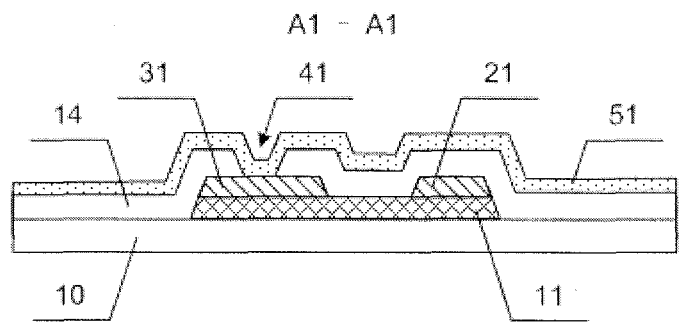
FIG. 2 is a sectional view taken along line A1-A1 in FIG. 1.
Figure 3:
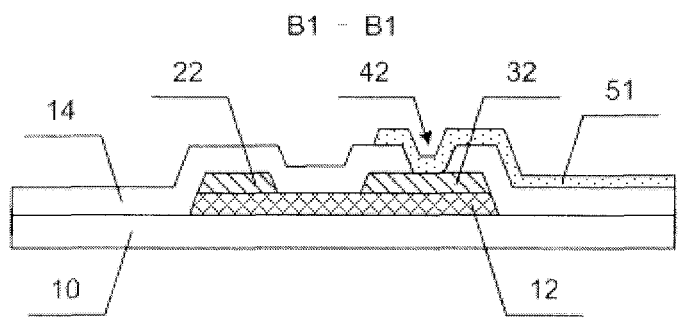
FIG. 3 is a sectional view taken along line B1-B1 in FIG. 1.
Figure 4:
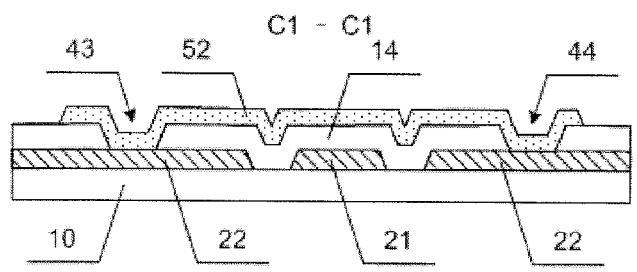
FIG. 4 is a sectional view taken along line C1-C1 in FIG. 1.

FIG. 1 is a schematic view showing a first embodiment of a touch screen according to the invention, in which two touch regions are shown. FIG. 2 is a sectional view taken along line A1-A1 in FIG. 1, FIG. 3 is a sectional view taken along line B1-B1 in FIG. 1, and FIG. 4 is a sectional view taken along line C1-C1 in FIG. 1.

As shown in FIG. 1 to FIG. 4, the touch screen according to the invention mainly comprises a plurality of first signal lines 21, a plurality of second signal lines 22, a plurality of first piezoelectric switches and a plurality of second piezoelectric switches, all of which are formed on a substrate 10. A plurality of touch regions are defined by the first signal lines 21 and the second signal lines 22 which are perpendicular to and insulated from each other. The first piezoelectric switch and the second piezoelectric switch are formed in each touch region, and the first piezoelectric switch connects with the first signal line 21, and the second piezoelectric switch connects with the second signal line 22. The first signal lines 21 integrally and continuously extend in the lateral direction, and the second signal lines 22 extend in the longitudinal direction in a discontinuous way. Each segment of the second signal line 22 is formed between two adjacent first signal lines 21 and has a discontinuity point on the sides of the first signal lines. The segments of the second signal line 22 are connected with each other by a connection electrode 52.

Specifically, the touch screen of this embodiment comprises a first active layer 11 and a second active layer 12 on the substrate 10. The first signal line 21 extending in the lateral direction is provided on the first active layer 11, and a first electrode 31 is also provided on the first active layer 11. A channel region of the first piezoelectric switch is formed between the first electrode 31 and the first signal line 21, thus the first active layer 11, the first signal line 21 and the first electrode 31 constitute the first piezoelectric switch. The first active layer 11 is used as a transfer layer, the first signal line 21 is used as a source electrode (or a drain electrode), and the first electrode 31 is used as a drain electrode (or a source electrode). The second signal line 22 extending in the longitudinal direction is provided on the second active layer 12, and a second electrode 32 is also provided on the second active layer 12. A channel region of the second piezoelectric switch is formed between the second electrode 32 and the second signal line 22, thus the second active layer 12, the second signal line 22 and the second electrode 32 constitute the second piezoelectric switch. The second active layer 12 is used as a transfer layer, the second signal line 22 is used as a source electrode (or a drain electrode), and the second electrode 32 is used as a drain electrode (or a source electrode). A first insulating layer 14 is formed on the first signal line 21, the first electrode 31, the second signal line 22 and the second electrode 32. A first via hole 41, a second via hole 42, a third via hole 43 and a fourth via hole 44 are formed in the first insulating layer 14. The first via hole 41 is provided over the first electrode 31, the second via hole 42 is provided over the second electrode 32, and the third via hole 43 and the fourth via hole 44 are respectively provided at the end portions of each segment of the second signal line 22 on both sides of the discontinuity point. A working electrode 51 and the connection electrode 52 are formed on the first insulating layer 14. The segments of the second signal line 22 on the two sides of the first signal line 21 are connected with each other by the connection electrodes 52 through the third via hole 43 and the fourth via hole 44 to form an integral and continuous structure. The working electrode 51 is formed in the region other than that of the connection electrode 52. The working electrode 51 is connected with first electrode 31 through the first via hole 41 and connected with the second electrode 32 through the second via hole 42.

According to this embodiment, the first signal line, the second signal line, the first piezoelectric switch and the second piezoelectric switch are formed on the substrate, the first piezoelectric switch and the second piezoelectric switch are turned on due to the charges generated on the surface of the piezoelectric film when the piezoelectric film is pressed, the first piezoelectric switch and the second piezoelectric switch transfer voltage signals through the first signal line and the second signal line, respectively, thus the coordinate in the touch region (at the touch point) can be determined. During operation, a working voltage (for example, 5V) is applied on the working electrode, and correspondingly such working voltage is applied on the first electrode of the first piezoelectric switch and the second electrode of the second piezoelectric switch. When the touch screen is not touched, the channel region of the first piezoelectric switch between the first signal line and the first electrode and the channel region of the second piezoelectric switch between the second signal line and the second electrode are in an insulating state, so that the first piezoelectric switch and the second piezoelectric switch are turned off and no signals are output via the first signal line and the second signal line. When the touch screen is touched by an object (such as a user's finger or a pen), the pressure applied from the finger to the touch screen is transferred to the first active layer and the second active layer formed by a piezoelectric material, then charges are generated on the surfaces of the first active layer and the second active layer because of the above pressure, and thus the channel region of the first piezoelectric switch and the channel region of the second piezoelectric are transferred to a conducting state (that is, the first piezoelectric switch and the second piezoelectric switch are turned on) and voltage signals are output via the first signal line and the second signal line. Since the first signal line is only connected with the first piezoelectric switch, a voltage signal only in one direction is output from the first signal line. Similarly, since the second signal line is only connected with the second piezoelectric switch, a voltage signal only in the other direction is output from the second signal line. When the plurality of first signal lines extending in the lateral direction are labeled with row numbers and the plurality of second signal lines extending in the longitudinal direction are labeled with column numbers, the row number corresponding to the touch point (the touch region) can be determined by the voltage signal output from the first signal line in certain row or rows, and the column number corresponding to the touch point can be determined by the voltage signal output from the second signal line in certain column or columns, and accordingly the coordinate of the touch point can be determined on basis of the above determined row number(s) and column number(s).

In this embodiment, the piezoelectric material for forming the first active layer and the second active layer may be selected from the group consisted of $PbZrTiO_3$ (PZT), zinc oxide (ZnO), aluminum nitride (AlN), for example. In another embodiment, a light-blocking layer 13 may be formed below the first active layer 11 and the second active layer 12. The light-blocking layer 13 is used to block light and thus has the function of a black matrix. In addition, in this embodiment, each of the touch regions constitutes one unit, and the area of each touch region is determined based on the touch accuracy at the touch point. As for a substrate with a given area, when the number of the touch regions defined by the intersecting of the first signal lines and the second signal lines is increased, the area of each touch region is decreased and the touch accuracy is improved accordingly. Since the area of the touch point may be considerably larger than that of the touch region in practice, the first piezoelectric switch and the second piezoelectric switch in this embodiment may be provided in one touch region (as the embodiment shown in FIG. 1), or may be respectively provided in two adjacent or close touch regions.

With the structure in which the signal line and the piezoelectric switch are provided, the touch screen in this embodiment has the advantages of simple structure, low cost, high accuracy, long life and the like. Compared with the conventional four-wire resistance type touch screen, the working electrode formed of conductive thin film in this embodiment is only used to provide the working voltage, and the operation of the touch screen is not adversely influenced even if damages (such as cracks) occur on the conductive thin film. Compared with the conventional five-wire resistance type touch screen, the structure of the touch screen in this embodiment is simplified and correspondingly the process difficulties are reduced by providing the signal lines and the piezoelectric switches on the same substrate, and thus the touch accuracy is not adversely influenced even if the thickness of the thin film is non-uniform. The touch screen in this embodiment can be manufactured by conventional apparatus with simple process and low cost, and thus the touch screen in this embodiment can have a wide application prospect.

FIG. 5 to FIG. 19 are schematic views showing the process of manufacturing the touch screen of the first embodiment. In the following descriptions, the patterning process typically comprises applying a photoresist layer, masking, exposing and developing the photoresist, etching with a photoresist pattern, removing the remaining photoresist and the like.

Figure 5:
FIG. 5 is a plan view after a first patterning process in the first embodiment of the touch screen according to the invention.
Figure 6:
FIG. 6 is a sectional view taken along line A2-A2 in FIG. 5.
Figure 7:
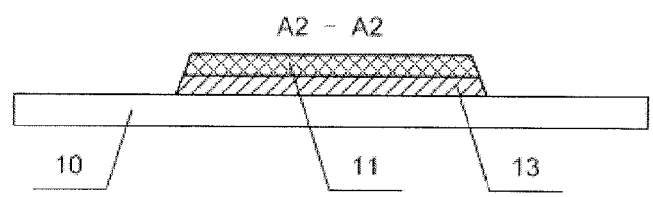
FIG. 7 is a sectional view taken along line B2-B2 in FIG. 5.

FIG. 5 is a plan view after a first patterning process in the first embodiment of the touch screen according to the invention, in which two touch regions are shown. FIG. 6 is a sectional view taken along line A2-A2 in FIG. 5 and FIG. 7 is a sectional view taken along line B2-B2 in FIG. 5. Firstly, a first metal film is deposited on the substrate 10 (such as a glass substrate or a quartz substrate) by a magnetron sputtering method or a thermal evaporation method, and the first metal film may be a single-layer film or a composite film of multiple metal layers. Then, a piezoelectric film is deposited by a metal organic chemical vapor deposition (MOCVD) method or a magnetron sputtering method. The first metal film and the piezoelectric film are patterned by using a normal mask to form the first active layer 11 and the second active layer 12 on the substrate 10, as shown in FIG. 5 to FIG. 7. After this patterning process, the first active layer 11 is provided in the one touch region, and the second active layer is formed in the other touch region. In addition, the first active layer 11 and the second active layer 12 may be provided in the same touch region. The light-blocking layer 13 formed by the first metal film is provided below the first active layer 11 and the second active layer 12. When both of the first metal film and the piezoelectric film are formed by a magnetron sputtering method, a continuous deposition process can be performed to sequentially deposit the first metal film and the piezoelectric film on the substrate.

Figure 8:
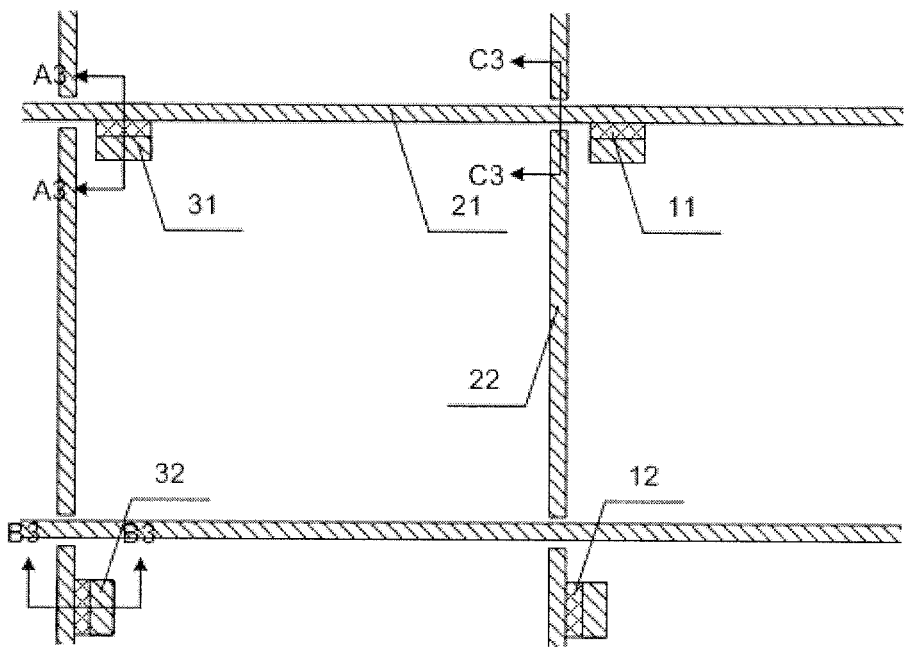
FIG. 8 is a plan view after a second patterning process in the first embodiment of the touch screen according to the invention.
Figure 9:
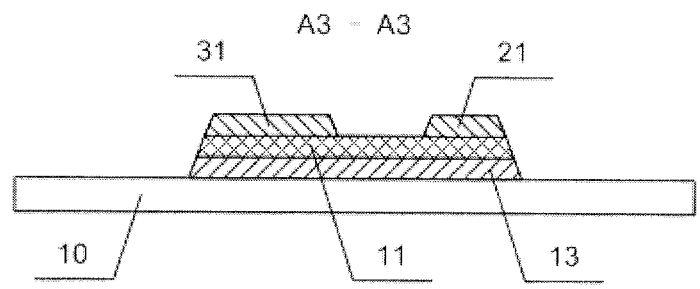
FIG. 9 is a sectional view taken along line A3-A3 in FIG. 8.
Figure 10:
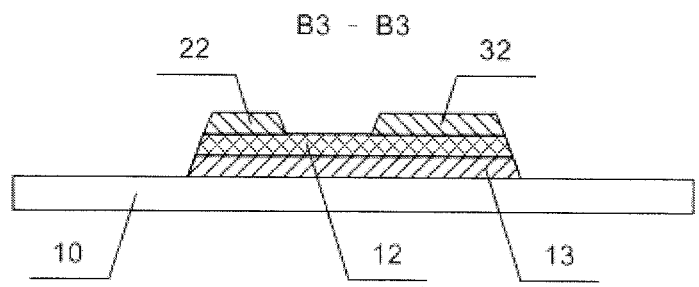
FIG. 10 is a sectional view taken along line B3-B3 in FIG. 8.
Figure 11:
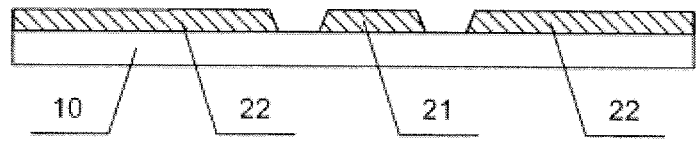
FIG. 11 is a sectional view taken along line C3-C3 in FIG. 8.

FIG. 8 is a plan view after a second patterning process in the first embodiment of the touch screen according to the invention, in which two touch regions are shown. FIG. 9 is a sectional view taken along line A3-A3 in FIG. 8, FIG. 10 is a sectional view taken along line B3-B3 in FIG. 8 and FIG. 11 is a sectional view taken along line C3-C3 in FIG. 8. On the substrate with the pattern shown in FIG. 5, a second metal film is deposited by a magnetron sputtering method or a thermal evaporation method. The second metal film may be a single-layer film or a composite film of multiple metal layers. The second metal film is patterned by using a normal mask to form the first signal line 21, the first electrode 31, the second signal line 22 and the second electrode 32, as shown in FIG. 8 to FIG. 11. The first signal line 21 integrally and continuously extends in the lateral direction and is provided on the first active layer. The second signal line 22 extends in the longitudinal direction in a discontinuous way. Each segment of the second signal line 22 is formed between two adjacent first signal lines 21 and has discontinuity points on the sides of the first signal line 21. The second signal line 22 is provided on the second active layer 12. The first electrode is formed on the first active layer 11 so that the channel region of the first piezoelectric switch is formed between the first electrode 31 and the first signal line 21. The second electrode 32 is provided on the second active layer 12 so that the channel region of the second piezoelectric switch is formed between the second electrode 32 and the second signal line 22.

Figure 12:
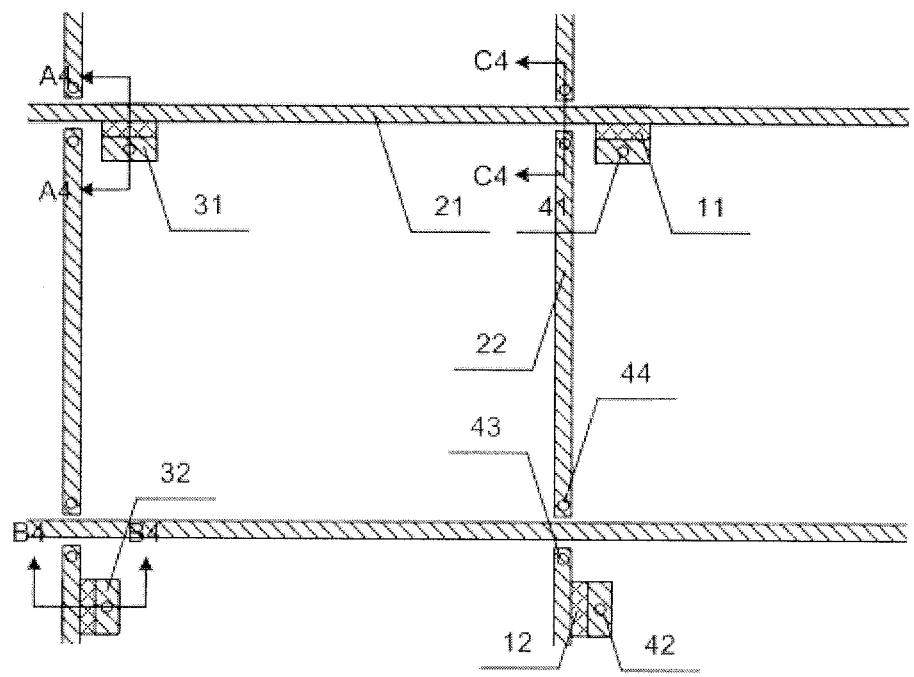
FIG. 12 is a plan view after a third patterning process in the first embodiment of the touch screen according to the invention.
Figure 13:
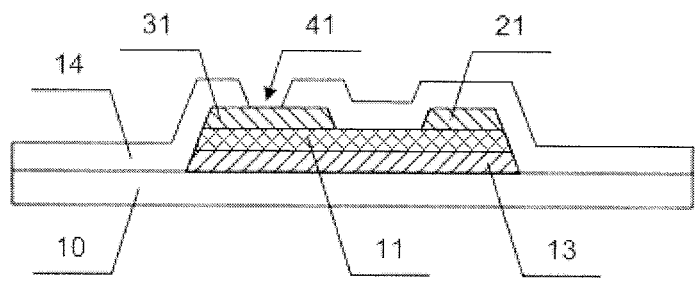
FIG. 13 is a sectional view taken along line A4-A4 in FIG. 12.
Figure 14:
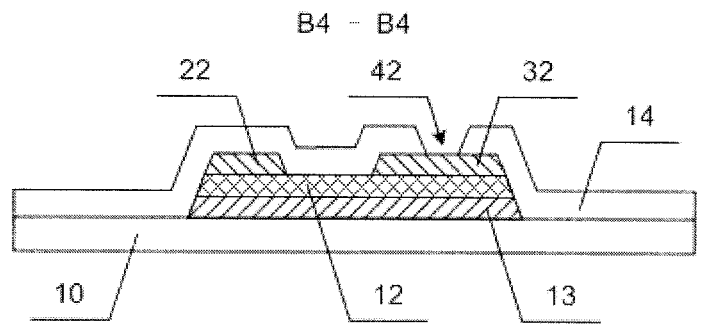
FIG. 14 is a sectional view taken along line B4-B4 in FIG. 12.
Figure 15:
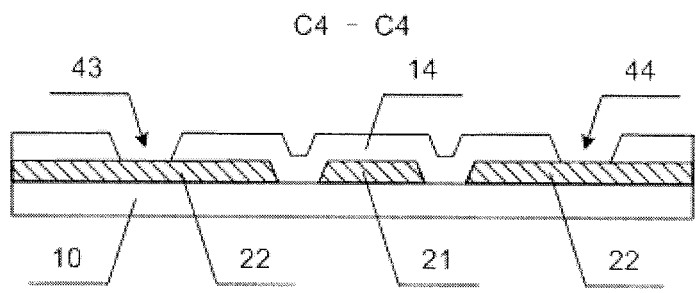
FIG. 15 is a sectional view taken along line C4-C4 in FIG. 12.

FIG. 12 is a plan view after a third patterning process in the first embodiment of the touch screen according to the invention, in which two touch regions are shown. FIG. 13 is a sectional view taken along line A4-A4 in FIG. 12, FIG. 14 is a sectional view taken along line B4-B4 in FIG. 12 and FIG. 15 is a sectional view taken along line C4-C4 in FIG. 12. On the substrate with the pattern shown in FIG. 8, the first insulating layer 14 is deposited by a plasma-enhanced chemical vapor deposition (PECVD) method. The first insulating layer 14 may be formed of an oxide, a nitride or an oxynitride. Then, the first insulating layer 14 is patterned by using a normal mask to form the first via hole 41, the second via hole 42, the third via hole 43 and the fourth via hole 44, as shown in FIG. 12 to FIG. 15. The first via hole 41 is provided over the first electrode 31 and expose the surface of the first electrode 31. The second via hole 42 is provided over the second electrode 32 and expose the surface of the second electrode 32. The third via hole 43 and the fourth via hole 44 are respectively provided at the end portions of the segments of the second signal line 22 on both sides of the discontinuity point to expose the surface of the second signal line 22.

Figure 16:
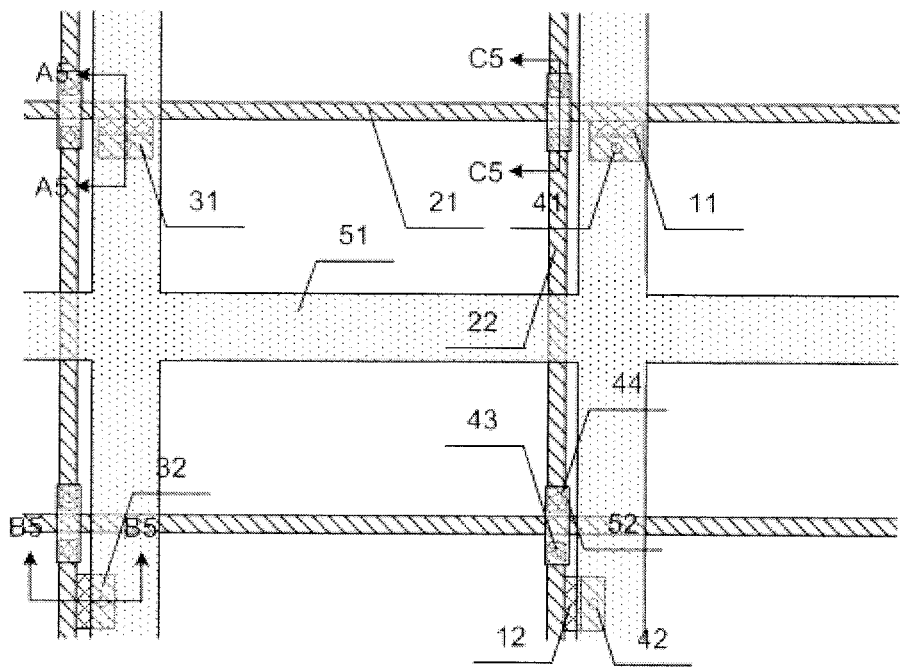
FIG. 16 is a plan view after a fourth patterning process in the first embodiment of the touch screen according to the invention.
Figure 17:
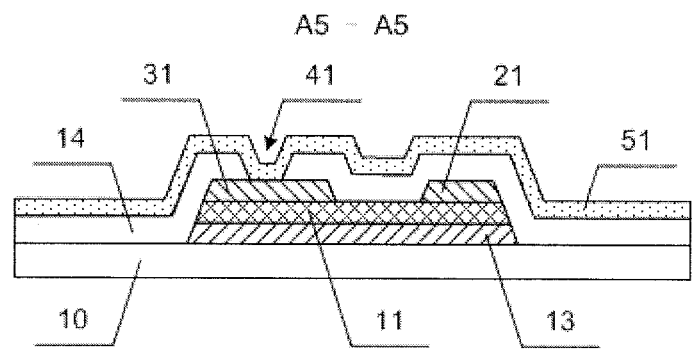
FIG. 17 is a sectional view taken along line A5-A5 in FIG. 16.
Figure 18:
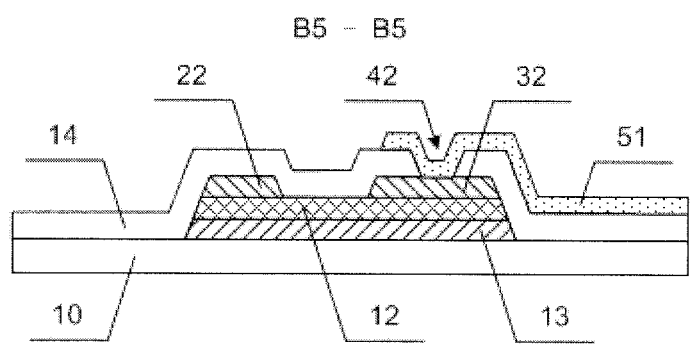
FIG. 18 is a sectional view taken along line B5-B5 in FIG. 16.
Figure 19:
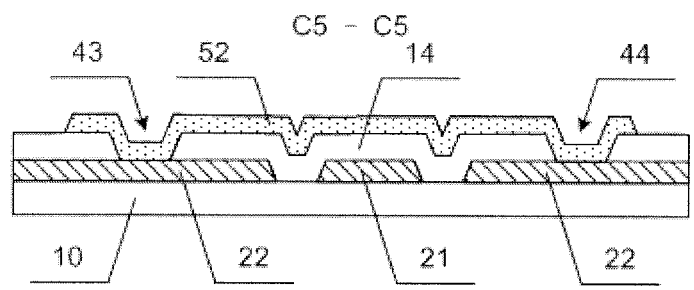
FIG. 19 is a sectional view taken along line C5-C5 in FIG. 16.

FIG. 16 is a plan view after a fourth patterning process in the first embodiment of the touch screen according to the invention, in which two touch regions are shown. FIG. 17 is a sectional view taken along line A5-A5 in FIG. 16, FIG. 18 is a sectional view taken along line B5-B5 in FIG. 16, and FIG. 19 is a sectional view taken along line C5-C5 in FIG. 16. On the substrate with the pattern shown in FIG. 12, a conductive thin film is deposited by a magnetron sputtering method of a thermal evaporation method. The conductive thin film is patterned by using a normal mask to form the working electrode 51 and the connection electrode 52, as shown in FIG. 16 to FIG. 19. The connection electrode 52 is formed between the end portions of the segments of the second signal line 22 on both sides of the discontinuity point and connects with the segments of the second signal line 22 through the third via hole 43 and the fourth via hole 44, and thus the plurality of segments of the second signal line 22 are connected with each other by the connection electrodes 52 through the corresponding third via holes 43 and fourth via holes 44 to form an integral and continuous structure. The working electrode 51 is formed in the region other than that of the connection electrode 52 and separated from the connection electrode 52. The working electrode 51 is connected with the first electrode 31 through the first via hole 41 and connected with the second electrode 32 through the second via hole 42. In practice, the conductive thin film for forming the working electrode 51 and the connection electrode 52 may be a metal film or a transparent conductive film. The transparent conductive film may comprise indium tin oxide (ITO), indium zinc oxide (IZO), aluminum zinc oxide or the like.

Figure 20:
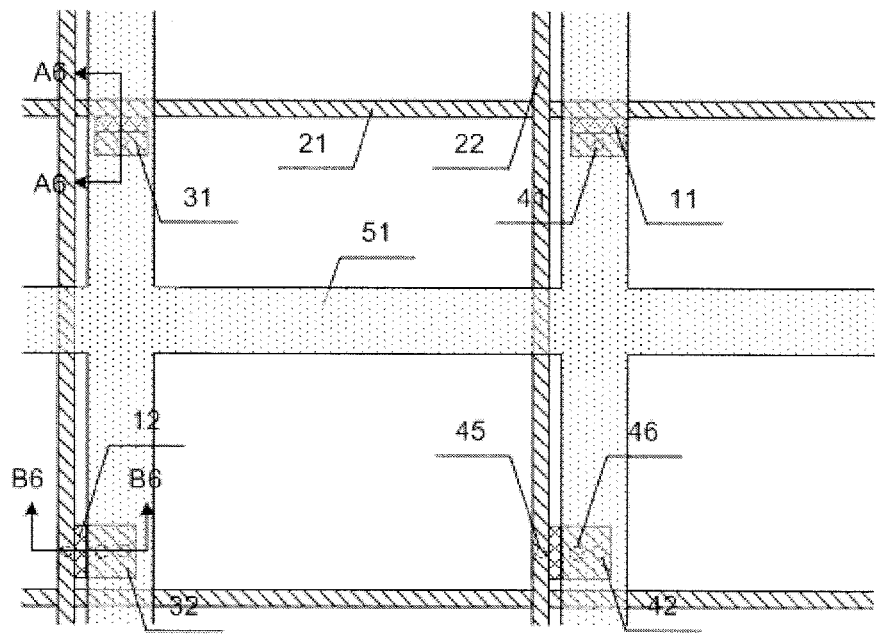
FIG. 20 is a schematic view showing a second embodiment of a touch screen according to the invention.
Figure 21:
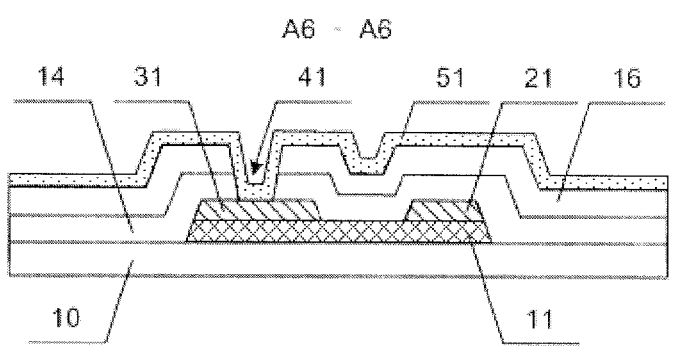
FIG. 21 is a sectional view taken along line A6-A6 in FIG. 20.
Figure 22:
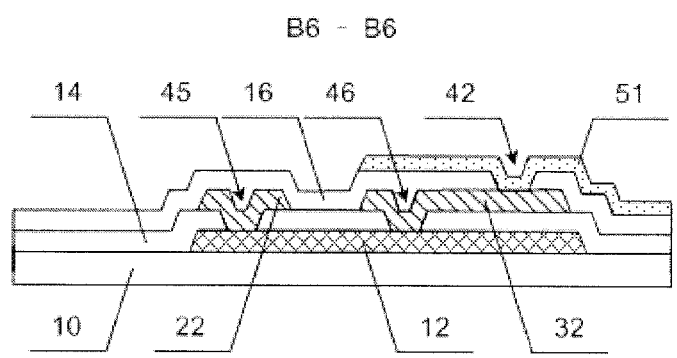
FIG. 22 is a sectional view taken along line B6-B6 in FIG. 20.

FIG. 20 is a schematic view showing a second embodiment of a touch screen according to the invention, in which two touch regions are shown. FIG. 21 is a sectional view taken along line A6-A6 in FIG. 20 and FIG. 22 is a sectional view taken along line B6-B6 in FIG. 20. As shown in FIG. 20 to FIG. 22, the main structure and the operation principle of the touch screen in this embodiment is similar to that in the above-described first embodiment. The touch screen in this embodiment mainly comprises the first signal line 21, the second signal line 22, the first piezoelectric switch and the second piezoelectric switch, all of which are formed on a substrate 10. The touch region is defined by the first signal line 21 and the second signal line 22, which are perpendicular to and insulated from each other. The first piezoelectric switch and the second piezoelectric switch are formed in the same touch region. The first piezoelectric switch connects with the first signal line 21, and the second piezoelectric switch connects with the second signal line 22. The first signal line 21 and the second signal line 22 integrally and continuously extend, respectively. The first signal line 21 is insulated from the second signal line 22 by the first insulating layer 14. In this embodiment, the first active layer 11 and the second active layer 12 are formed on the substrate 10. The first electrode 31 and the first signal line 21 extending in the lateral direction are provided on the first active layer 11 and the channel region of the first piezoelectric switch is formed between the first electrode 31 and the first signal line 21, and thus the first active layer 11, the first signal line 21 and the first electrode 31 constitute the first piezoelectric switch. The first insulating layer 14 is formed on the first signal line 21 and the first electrode 31 and covers the entirety of the substrate. A fifth via hole 45 and a six via hole 46 are provided in the first insulating layer 14 and positioned over the second active layer 12. The second electrode 32 and the second signal line 22 extending in the longitudinal direction are formed on the first insulating layer 14. The second signal line 22 is connected with the second active layer 12 through the fifth via hole 45, and the second electrode 32 is connected with the second active layer 12 through the sixth via hole 46. The channel region of the second piezoelectric switch is formed between the second electrode 32 and the second signal line 22 so that the second active layer 12, the second signal line 22 and the second electrode 32 constitute the second piezoelectric switch. A second insulating layer 16 is formed on the second signal line 22 and the second electrode 32 and covers the entirety of the substrate. The first via hole 41 and the second via hole 42 are provided in the second insulating layer 16. The first via hole 41 is provided over the second electrode 31 and expose the surface of the first electrode 31. The second via hole 42 is provided over the second electrode 32 and expose the surface of the second electrode 32. In addition, the working electrode 51 is formed on the second insulating layer 16. The working electrode 51 is connected with the first electrode 31 through the first via hole 41 and connected with the second electrode 32 through the second via hole 42.

The touch screen in this embodiment may be manufactured by the following process. Firstly, the piezoelectric film is deposited on the substrate to form the first active layer 11 and the second active layer 12. The first active layer 11 and the second active layer 12 are formed in the same touch region. Moreover, the light-blocking layer may be further formed below the first active layer and the second active layer 12. On the substrate with the above pattern, the second metal film is deposited to form the first signal line 21 and the first electrode 31 by a patterning process. The first signal line 21 integrally and continuously extends in the lateral direction and is provided on the first active layer. The first electrode 31 is provided on the first active layer 11 so that the channel region of the first piezoelectric switch is formed between the first electrode 31 and the first signal line 21. Then, the first insulating layer 14 is deposited and patterned to form the fifth via hole 45 and the sixth via hole 46 therein by a patterning process. The fifth via hole 45 and the sixth via hole 46 are provided over the second active layer 12 to expose the surface of the second active layer 12. Next, the third metal film is deposited and patterned to form the second signal line 22 and the second electrode 32 by a patterning process. The second signal line 22 integrally and continuously extends in the longitudinal direction and is connected with the second active layer 12 through the fifth via hole 45. The second electrode 32 is connected with the second active layer 12 through the sixth via hole 46 so that the channel region of the second piezoelectric switch is formed between the second electrode 32 and the second signal line 22. The third metal film may be formed by the same material as that of the second metal film. Next, a second insulating layer 16 is deposited and patterned to form the first via hole 41 and the second via hole 42 therein through a patterning process. The first via hole 41 is provided over the first electrode 31, and the first insulating layer 14 and the second insulating layer 16 in the first via hole 41 are etched away to expose the surface of the first electrode 31. The second via hole 42 is provided over the second electrode 32, and the second insulating layer 16 in the second via hole 42 is etched away to expose the surface of the second electrode 32. Finally, the conductive thin film is deposited to form the working electrode 51 by a patterning process. The working electrode 51 covers the first electrode 31 and the second electrode 32, is connected with the first electrode 31 through the first via hole 41 and with the second electrode 32 through the second via hole 42.

It should be noted that the above embodiments of the touch screen intends to exemplify but not limits the invention, and various modifications, alterations and combinations can be made depending on the practical requirements. For example, in the first embodiment, the second signal line may integrally and continuously extend in the longitudinal direction while the first signal line discontinuously extends in the lateral direction and has discontinuity points on the sides of the second signal line; the touch region in which the first piezoelectric switch and the second piezoelectric switch are provided may be provided adjacent in the lateral direction or in the longitudinal direction, or it may be alternatively provided. In addition, in the second embodiment, the second signal line and the second electrode may be firstly formed, and then the first signal line and the first electrode may be formed. In addition, the working electrode may have other shapes depending on the design requirements.

A method of manufacturing a touch screen according to an embodiment of the invention may comprises the following steps:

Step 11 of depositing a piezoelectric film on a substrate and forming a first active layer and a second active layer by a patterning process;

Step 12 of forming a first signal line, a first electrode, a second signal line and a second electrode on the substrate after the Step 11, wherein both of the first signal line and the first electrode are connected with the first active layer, a channel region of a first piezoelectric switch is formed between the first electrode and the first signal line, both of the second signal line and the second electrode are connected with the second active layer, and a channel region of a second piezoelectric switch is formed between the second electrode and the second signal line;

Step 13 of depositing an insulating layer on the substrate after the Step 12 and forming a first via hole and a second via hole therein by a patterning process, wherein the first via hole is provided over the first electrode and the second via hole is provided over the second electrode;

Step 14 of depositing a conductive thin film on the substrate after the Step 13 and forming a working electrode by a patterning process, wherein the working electrode is connected with the first electrode through the first via hole and with the second electrode through the second via hole.

In the above method of manufacturing the touch screen according to the embodiment, the Step 12 can be performed in different ways to form the first signal line, the first electrode, the second signal line and the second electrode. Two examples of the method are described as follows.

The first example of the method of manufacturing the touch screen according to the embodiment comprises the following steps:

Step 111 of depositing the piezoelectric film on the substrate and forming the first active layer and the second active layer by a patterning process;

Step 112 of depositing a second metal film on the substrate after the Step 111 and forming the first signal line, the first electrode, the second signal line and the second electrode on the substrate by a patterning process, wherein the first signal line integrally and continuously extends and is provided on the first active layer, the first electrode is also provided on the first active layer so that the channel region of the first piezoelectric switch is formed between the first electrode and the first signal line, the second signal line discontinuously extends and is provided on the second active layer, two segments of the second signal line are formed on two sides of the first signal line, and the second electrode is also provided on the second active layer so that the channel region of the second piezoelectric switch is formed between the second electrode and the second signal line;

Step 113 of depositing a first insulating layer on the substrate after the Step 112 and forming the first via hole, the second via hole, a third via hole and a fourth via hole in the first insulating layer by a patterning process, wherein the first via hole is provided over the first electrode, the second via hole is provided over the second electrode, the third via hole and the fourth via hole are respectively provided at both end portions of each segment of the second signal line;

Step 114 of depositing the conductive thin film on the substrate after the Step 113 and forming the working electrode and a connection electrode through a patterning process, wherein the segments of the second signal line are connected with each other by the connection electrode through the third via hole and the fourth via hole, the working electrode is formed in the region other than that of the connection electrode, and the working electrode is connected with the first electrode through the first via hole and with the second electrode through the second via hole.

The method in this example can be used to manufacture the structure in the first embodiment of the touch screen according to the invention, and the detailed description of processes thereof has been described in detail with reference to FIG. 5 to FIG. 19.

The second example of the method of manufacturing the touch screen according to the invention comprises the following steps:

Step 211 of depositing the piezoelectric film on the substrate and forming the first active layer and the second active layer by a patterning process;

Step 212 of depositing a second metal film on the substrate after the Step 211 and forming the first signal line and the first electrode, wherein both of the first signal line and the first electrode are connected with the first active layer, the channel region of the first piezoelectric switch is formed between the first electrode and the first signal line;

Step 213 of deposing a first insulating layer on the substrate after the Step 212 and forming a fifth via hole and a sixth via hole therein by a patterning process, wherein the fifth via hole and the sixth via hole are provided over the second active layer;

Step 214 of depositing a third metal film on the substrate after the Step 213 and forming the second signal line and the second electrode by a patterning process, wherein the second signal line is connected with the second active layer through the fifth via hole, the second electrode is connected with the second active layer through the sixth via hole, and the channel region of the second piezoelectric switch is formed between the second signal line and the second electrode;

Step 215 of depositing a second insulating layer on the substrate after the Step 214 and forming the first via hole and the second via hole therein by a patterning process, wherein the first via hole is provided over the first electrode and exposes the surface of the first electrode, the second via hole is provided over the second electrode and exposes the surface of the second electrode;

Step 216 of depositing the conductive thin film on the substrate after the Step 215 and forming the working electrode by a patterning process, wherein the working electrode is connected with the first electrode through the first via hole and with the second electrode through the second via hole.

The method in this example can be used to manufacture the structure in the second embodiment of the touch screen according to the invention, and the detailed description of processes thereof has been described in detail with reference to FIG. 20 to FIG. 23.

With the structure in which the signal lines and the piezoelectric switches are provided, the touch screen manufactured by the above-described method has the advantages of simple structure, low cost, high accuracy, long life and the like. In addition, the above-described method can be performed with conventional apparatuses with simple process and low cost, and thus the method can have a wide application prospect.

In addition, a light-blocking layer may be provided below the first active layer and the second active layer depending on the practical requirements. The light-blocking layer is used to block light and thus has the function of a black matrix. Accordingly, the Step 11 comprises: sequentially depositing a first metal film and the piezoelectric film and forming the first active layer and the second active layer by a patterning process, wherein a light-blocking layer is formed below the first active layer and the second active layer.

Figure 23:
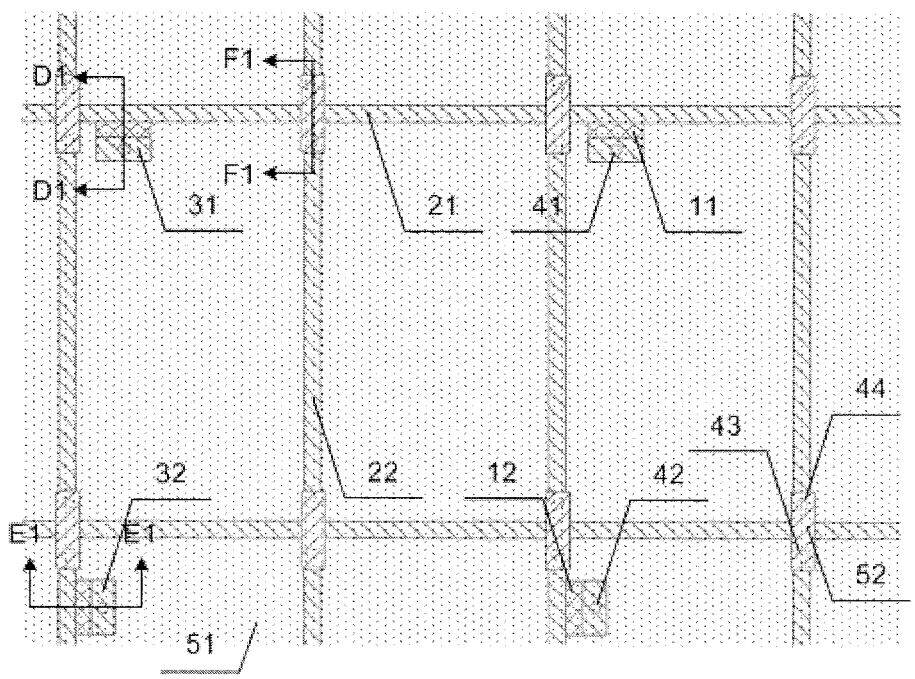
FIG. 23 is a plan view showing a first embodiment of a color filter substrate according to the invention.
Figure 24:
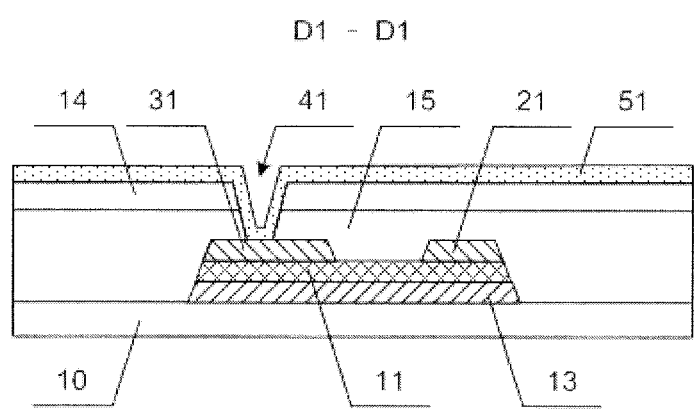
FIG. 24 is a sectional view taken along line D1-D1 in FIG. 23.
Figure 25:
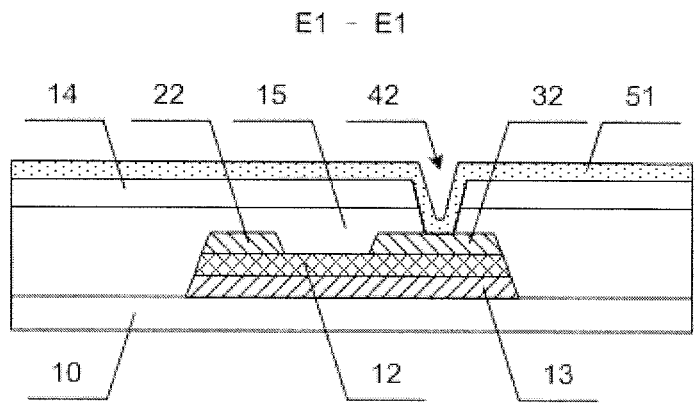
FIG. 25 is a sectional view taken along line E1-E1 in FIG. 23.
Figure 26:
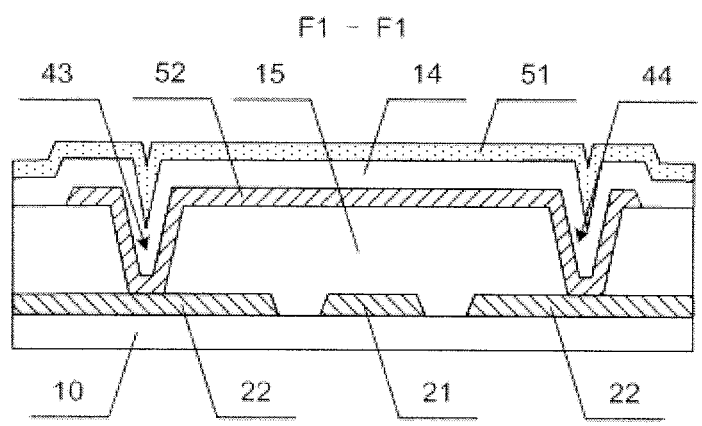
FIG. 26 is a sectional view taken along line F1-F1 in FIG. 23.

FIG. 23 is a plan view showing a first embodiment of a color filter substrate according to the invention, in which three pixel regions are shown. FIG. 24 is a sectional view taken along line D1-D1 in FIG. 23, FIG. 25 is a sectional view taken along line E1-E1 in FIG. 23 and FIG. 26 is a sectional view taken along line F1-F1 in FIG. 23.

As shown in FIG. 23 to FIG. 26, the color filter substrate mainly comprises a touch structure layer and a color filter structure layer, both of which are formed on a substrate 10. The touch structure layer is used to determine the coordinate of the touch point, and the color filter structure layer is used for color display. The touch structure layer comprises a plurality of first signal lines 21, a plurality of second signal lines 22, a plurality of first piezoelectric switches, a plurality of second piezoelectric switches and a working electrode 51, all of which are formed on the substrate 10. A plurality of pixel regions are defined by the intersecting of the first signal lines 21 and the second signal lines 22, which are perpendicular to and insulated from each other. One first piezoelectric switch and one second piezoelectric switch can be formed in each of the pixel regions. The first piezoelectric switch is connected with the first signal line 21, and the second piezoelectric switch is connected with the second signal line 22. The color filter structure layer comprises a color resin layer 15 and a common electrode. The common electrode in the color filter structure layer can be integrally formed with the working electrode in the touch structure layer.

Specifically, a first active layer 11 and a second active layer 12 are formed on the substrate 10. The first active layer 11 and the second active layer 12 are fowled of a piezoelectric film. A light-blocking layer 13 is formed below the first active layer 11 and the second active layer 12. The light-blocking layer 13 is used to block light and thus has the function of a black matrix. The first signal line 21 extending in the lateral direction is provided on the first active layer 11, and a first electrode 31 is also provided on the first active layer 11. A channel region of the first piezoelectric switch is formed between the first electrode 31 and the first signal line 21, thus the first active layer 11, the first signal line 21 and the first electrode 31 constitute the first piezoelectric switch. The first active layer 11 is used as a transfer layer, the first signal line 21 is used as a source electrode (or a drain electrode), and the first electrode 31 is used as a drain electrode (or a source electrode). The second signal line 22 extending in the longitudinal direction is provided on the second active layer 12, and a second electrode 32 is also provided on the second active layer 12. A channel region of the second piezoelectric switch is formed between the second electrode 32 and the second signal line 22, thus the second active layer 12, the second signal line 22 and the second electrode 32 constitute the second piezoelectric switch. The second active layer 12 is used as a transfer layer, the second signal line 22 is used as a source electrode (or a drain electrode), and the second electrode 32 is used as a drain electrode (or a source electrode). The first signal line 21 integrally and continuously extends, and the second signal line 22 discontinuously extends. The segment of the second signal line 22 is formed between two adjacent first signal lines 21 and has a discontinuity points on the sides of the first signal lines 21. The pixel regions are formed by intersecting of the first signal lines 21 and the second signal lines 22. The color resin layer 15 is formed on the first signal line 21, the first electrode 31, the second signal line 22 and the second electrode 32. The color resin layer 15 can comprise a red resin layer, a blue resin layer and a green resin pattern. The unit pattern of each color corresponds to one pixel region, and thus color pixel region is formed. A third via hole 43 and a fourth via hole 44 are provided in the color resin layer 15. The third via hole 43 and the fourth via hole 44 are respectively provided at the end portions of the segment of the second signal line 22 on both sides of the discontinuity point. A connection electrode 52 is formed on the color resin layer 15 and is connected with the segments of the second signal line 22 through the third via hole 43 and the fourth via hole 44, thus the segments of the second signal line 22 are connected with each other by the connection electrode 52 to form an integral and continuous structure. A first insulating layer 14 is formed on the connection electrode 52 and covers the entirety of the substrate. A first via hole 41 and a second via hole 42 are formed in the first insulating layer 14. The first via hole 41 is provided over the first electrode 31, and the first insulating layer 14 and the color resin layer 15 in the first via hole 41 are etched away to expose the surface of the first electrode 31. The second via hole 42 is provided over the second electrode 32, and the first insulating layer 14 and the color resin layer 15 in the second via hole 42 are etched away to expose the surface of the second electrode 32. The working electrode 51 is formed on the first insulating layer 14, and is connected with the first electrode 31 through the first via hole 41 and with the second electrode 32 through the second via hole 42. In addition, in this embodiment, the working electrode 51 is also used as the common electrode of the color filter structure layer.

FIG. 27 to FIG. 36 are schematic views showing the manufacture process of the color filter substrate in this embodiment, further explaining the color filter substrate in this embodiment. In the following description, the deposition processes and materials may be similar to those used in the embodiment of manufacturing the touch screen, and the details thereof are omitted here for simplicity.

A first patterning process in the first embodiment of the color filter substrate may also refer to FIG. 5 to FIG. 7 and the descriptions thereof. After the first patterning process, the first active layer 11 is provided in a pixel region, and the second active layer is provided in another pixel region. In addition, the first active layer 11 and the second active layer 12 can be provided in the same pixel region. A second patterning process in the first embodiment of the color filter substrate may also refer to FIG. 8 to FIG. 11 and the descriptions thereof.

Figure 27:
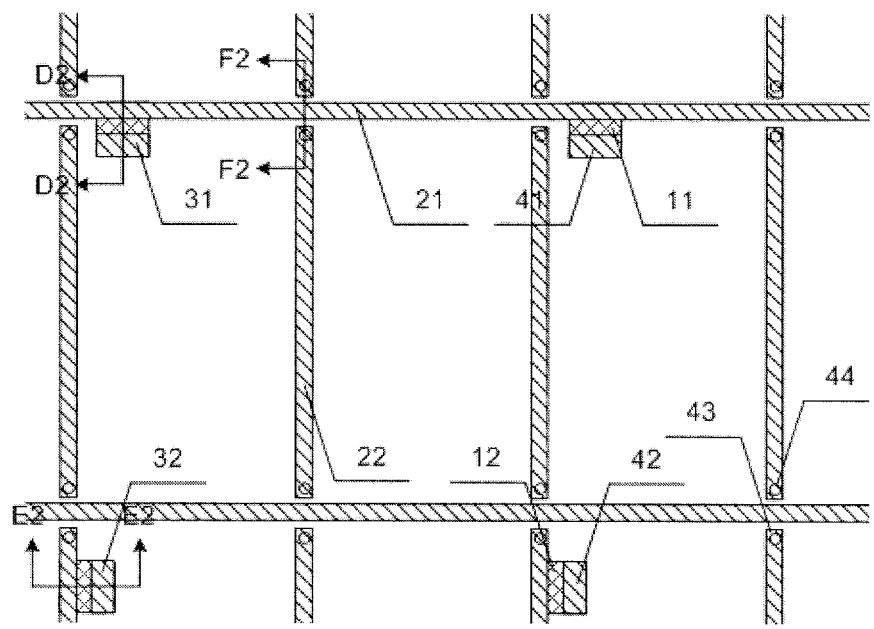
FIG. 27 is a plan view after a color resin layer is formed in the first embodiment of the color filter substrate according to the invention.
Figure 28:
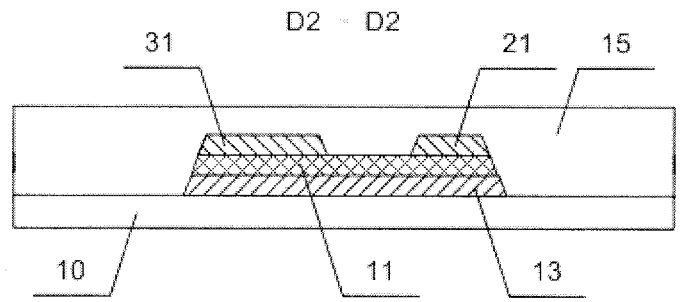
FIG. 28 is a sectional view taken along line D2-D2 in FIG. 27.
Figure 29:
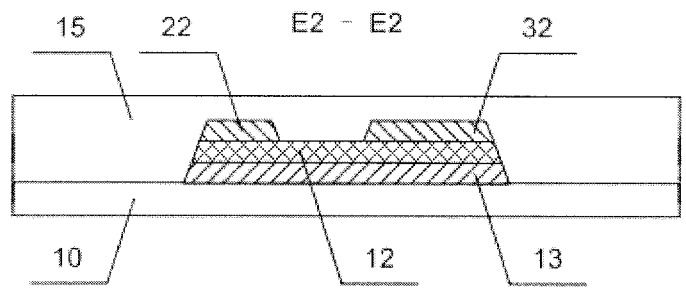
FIG. 29 is a sectional view taken along line E2-E2 in FIG. 27.
Figure 30:
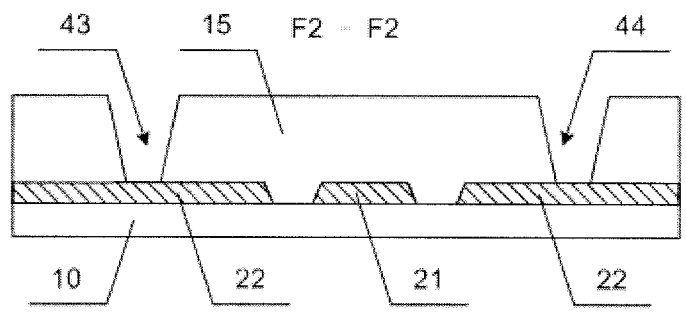
FIG. 30 is a sectional view taken along line F2-F2 in FIG. 27.

FIG. 27 is a plan view after the color resin layer is formed in the first embodiment of the color filter substrate according to the invention, in which three pixel regions are shown. FIG. 28 is a sectional view taken along line D2-D2 in FIG. 27, FIG. 29 is a sectional view taken along line E2-E2 in FIG. 27 and FIG. 30 is a sectional view taken along line F2-F2 in FIG. 27. After the previous processes, the color resin layer 15 is formed by a photolithography process, and the third via hole 43 and the fourth via hole 44 are formed in the color resin layer 15, as shown in FIG. 27 to FIG. 30. The third via hole 43 and the fourth via hole 44 are respectively provided at the end portions of the segments of the second signal line 22 on both sides of the discontinuity point. The color resin layer in the third via hole 43 and the fourth via hole 44 is etched away to expose the surface of the second signal line 22. The process for forming the color resin layer in this embodiment is a typical process and mainly comprises the steps as follows. Firstly, a red resin layer is applied. Then, the red resin layer is exposed by using a normal mask to form a completely removed region and a retained region of the red resin layer. Next, a developing process is performed so that the red resin layer in the completely removed region is completely removed and the red resin layer in the retained region is retained. Then, a baking process is performed to form the red rein pattern, the third via hole and the fourth via hole. Similarly, the blue resin pattern and the green resin pattern can be sequentially formed. The red resin pattern, the blue resin pattern and the green resin pattern constitute the color resin layer in this embodiment. Each of the red resin pattern, the blue resin pattern and the green resin pattern is formed in the pixel region defined by one first signal line and one second signal line. In addition, the first signal line and the second signal line has the function of a black matrix. In practice, the red resin pattern, the blue resin pattern and the green resin pattern may be formed in a random order.

Figure 31:
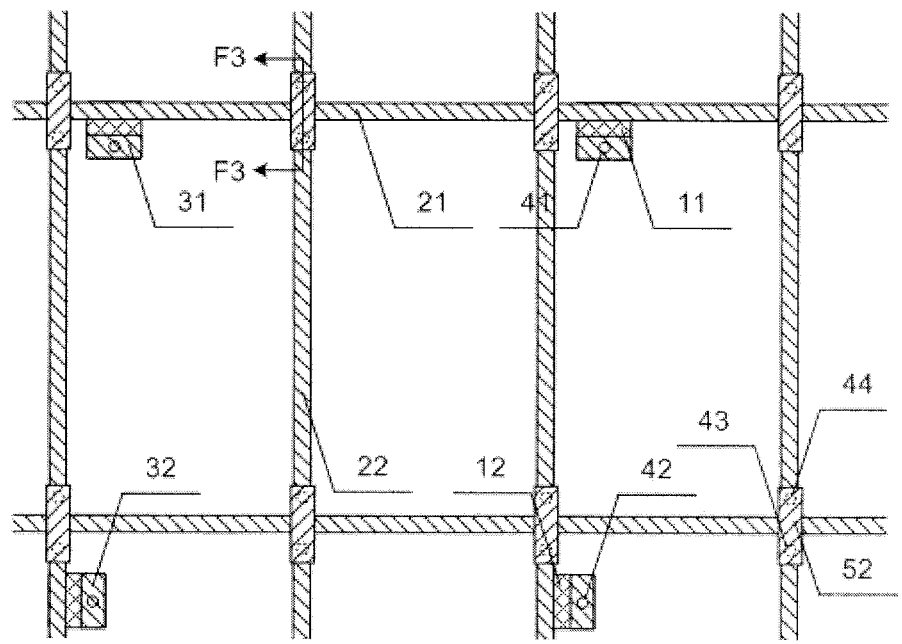
FIG. 31 is a plan view after a fourth patterning process in the first embodiment of the color filter substrate according to the invention.
Figure 32:
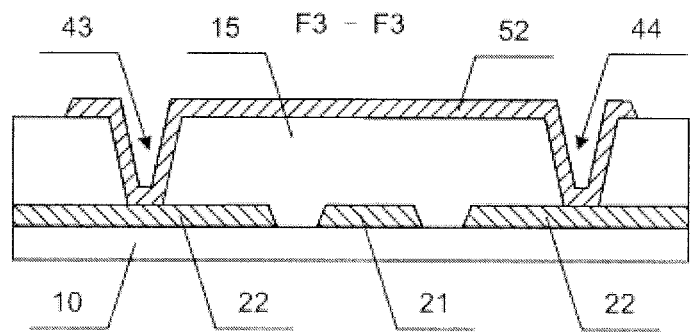
FIG. 32 is a sectional view taken along line F3-F3 in FIG. 31.

FIG. 31 is a plan view after a fourth patterning process in the first embodiment of the color filter substrate according to the invention, in which three pixel regions are shown. FIG. 32 is a sectional view taken along line F3-F3 in FIG. 31. On the substrate with the pattern shown in FIG. 27, a third metal film is deposited by a magnetron sputtering method or a thermal evaporation method, and then the third metal film is patterned by a normal mask to form the connection electrodes 52, as shown in FIG. 31 and FIG. 32. Each of the connection electrodes 52 is formed between the segments of the second signal line 22 on both sides of the discontinuity point and is connected with the segments of the second signal line 22 through the third via hole 43 and the fourth via hole 44. Thus, the segments of the second signal line 22 are connected with each other by the connection electrodes 52 through the corresponding third via holes 43 and fourth via holes 44 to form an integral and continuous structure.

Figure 33:
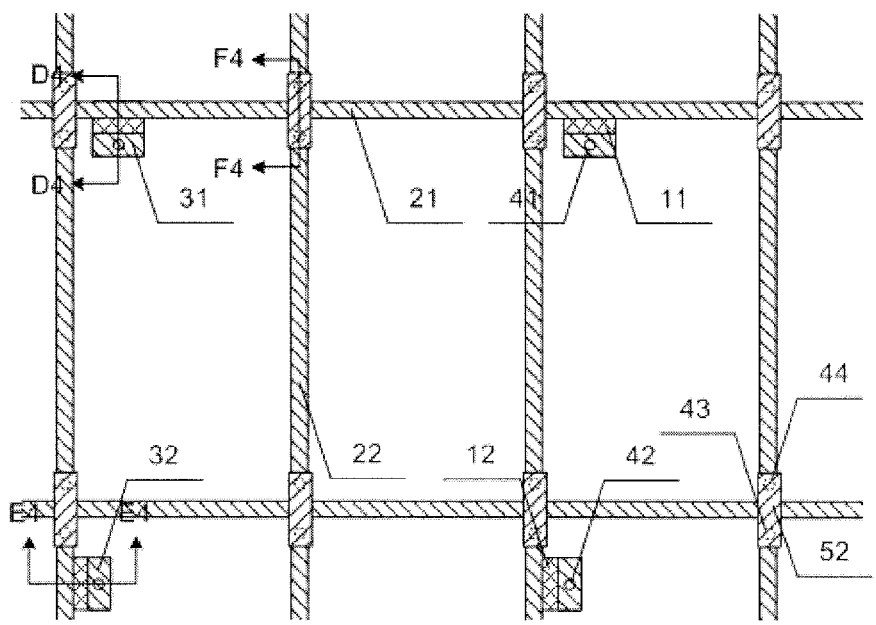
FIG. 33 is a plan view after a fifth patterning process in the first embodiment of the color filter substrate according to the invention.
Figure 34:
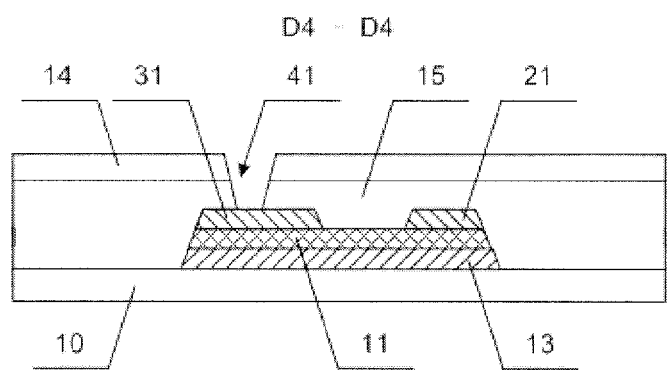
FIG. 34 is a sectional view taken along line D4-D4 in FIG. 33.
Figure 35:
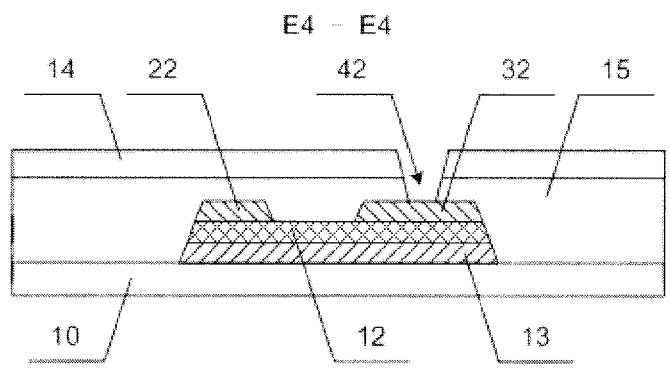
FIG. 35 is a sectional view taken along line E4-E4 in FIG. 33.
Figure 36:
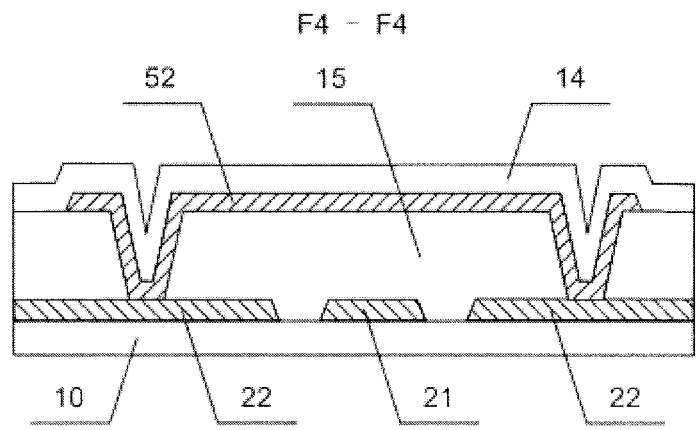
FIG. 36 is a sectional view taken along line F4-F4 in FIG. 33.

FIG. 33 is a plan view after a fifth patterning process in the first embodiment of the color filter substrate according to the invention, in which three pixel regions are shown. FIG. 34 is a sectional view taken along line D4-D4 in FIG. 33, FIG. 35 is a sectional view taken along line E4-E4 in FIG. 33 and FIG. 36 is a sectional view taken along line F4-F4 in FIG. 33. On the substrate with the pattern shown in FIG. 31, the first insulating layer 14 is deposited by a PECVD method, and then the first insulating layer 14 is patterned by using a normal mask to form the first via hole 41 and the second via hole 42 therein, as shown in FIG. 33 to FIG. 36. The first via hole 41 is provided over the first electrode 31, and the first insulating layer 14 and the color resin layer 15 in the first via hole 41 are etched away to expose the surface of the first electrode 31. The second via hole 42 is provided over the second electrode 32, and the first insulating layer 14 and the color resin layer 15 in the second via hole 42 are etched away to expose the surface of the second electrode 32.

Finally, on the substrate with the pattern shown in FIG. 33, a conductive thin film is deposited by a magnetron sputtering method or a thermal evaporation method to form the working electrode 51. The working electrode 51 is connected with the first electrode 31 through the first via hole 41 and with the second electrode through the second via hole 42, as shown in FIG. 23 to FIG. 26. In this embodiment, the conductive thin film is a transparent conductive film so that the working electrode 51 can be simultaneously used as the common electrode of the color filter structure layer.

The color filter substrate with touch function is provided in this embodiment, in which the touch structure layer is used to determine the coordinate of the touch point and the color filter structure layer is used to accomplish color display. In this embodiment, the touch screen that is previously described is applied to the touch structure layer, and thus the touch structure and the color filter structure are combined to obtain the color filter substrate with touch function. The structure and the operation principle of the touch structure layer of the color filter substrate in this embodiment is similar to the touch screen that is previously described, the structure and the operation principle of the color filter structure layer is similar to a conventional color filter substrate. In addition, the first signal line and the second signal line of the touch structure layer in this embodiment further has the function of a black matrix to block light, in addition to the function of transmitting signal. Furthermore, in this embodiment, the common electrode of the color filter structure layer and the working electrode of the touch structure layer are integrally formed.

Since the touch screen that is previously described is applied to the touch structure layer, the color filter substrate in this embodiment has the advantages of simple structure, low cost, high accuracy, long life and the like in terms of the touch function. In addition, since the first signal line and the second signal line in the touch structure layer is further used as a black matrix and the common electrode of the color filter structure layer and the working electrode of the touch structure layer are integrally formed, the color filter substrate in this embodiment provides a high-accuracy and long-life touch function without increasing the structural complexity and producing cost in terms of color filter function. Therefore, the color filter substrate in this embodiment can have a wide application.

In practice, the first piezoelectric switch and the second piezoelectric switch of the color filter substrate in this embodiment may be provided in the same pixel region, or may be respectively provided in two adjacent or close pixel regions. In addition, the pair of the first piezoelectric switch and the second piezoelectric switch may be provided in the area of 30~100 pixel regions. That is, among 30~100 pixel regions, only one pixel region or two adjacent or abutted pixel regions are provided with the pair of the first piezoelectric switch and the second piezoelectric switch. Therefore, given high touch accuracy, the adverse influence of the touch function on the display property can be greatly decreased.

Figure 37:
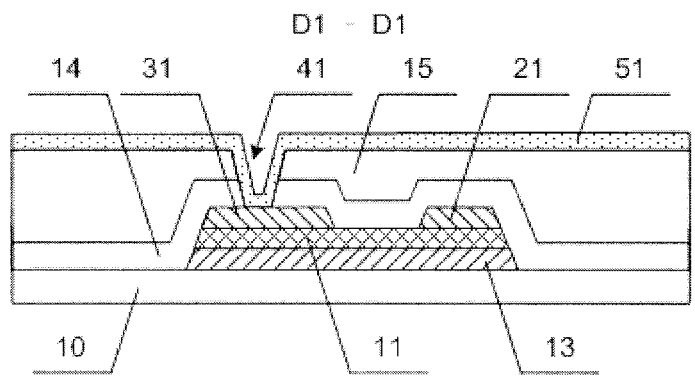
FIG. 37 and FIG. 38 are schematic views showing a second embodiment of a color filter substrate according to the invention.
Figure 38:
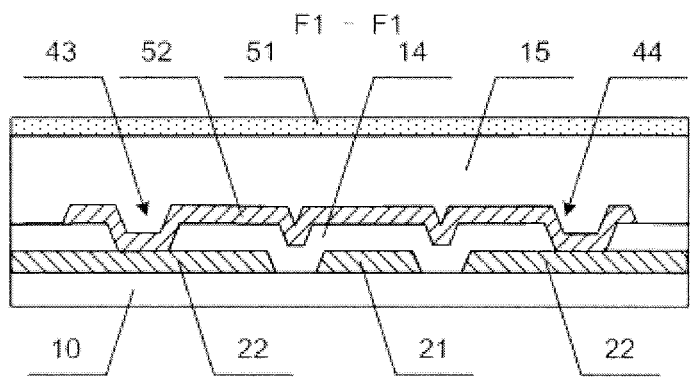

FIG. 37 and FIG. 38 are schematic views showing a second embodiment of a color filter substrate according to the invention. FIG. 37 corresponds to the sectional view taken along line D1-D1 in FIG. 23, and FIG. 38 corresponds to the sectional view taken along line F1-F1 in FIG. 23. As shown in FIG. 37 and FIG. 38, the structure and the operation principle of the color filter substrate in this embodiment is similar to those in the first embodiment, and the color filter substrate in this embodiment also comprise the touch structure layer and the color filter structure layer. However, in this embodiment, the first insulating layer 14 is formed on the first signal line 21, the first electrode 31, the second signal line 22 and the second electrode 32, the third via hole 43 and the fourth via hole 44 are formed in the first insulating layer 14, the connection electrode 52 is formed on the first insulating layer 14 and connects with the segments of the second signal line 22 through the third via hole 43 and the fourth via hole 44. The color resin layer 15 is formed on the connection electrode 52 and on the first insulating layer 14 in the region other than that of the connection electrode 52. The first via hole 41 and the second via hole 42 are formed in the color resin layer 15. The color resin layer 15 and the first insulating layer 14 in the first via hole 41 are etched away to expose the surface of the first electrode 31, and the color resin layer 15 and the first insulating layer 14 in the second via hole 42 are etched away to expose the surface of the second electrode 32. The working electrode 51 is formed on the color resin layer 15. The working electrode 51 is connected with the first electrode 31 through the first via hole 41 and with the second electrode 32 through the second via hole 42. In this embodiment, the conductive thin film is a transparent conductive film, so that the working electrode 51 can be simultaneously used as the common electrode of the color filter structure layer.

Figure 39:
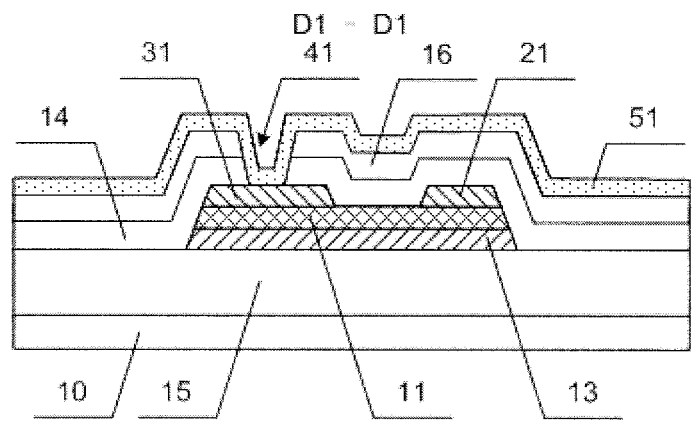
FIG. 39 and FIG. 40 are schematic views showing a third embodiment of a color filter substrate according to the invention.
Figure 40:
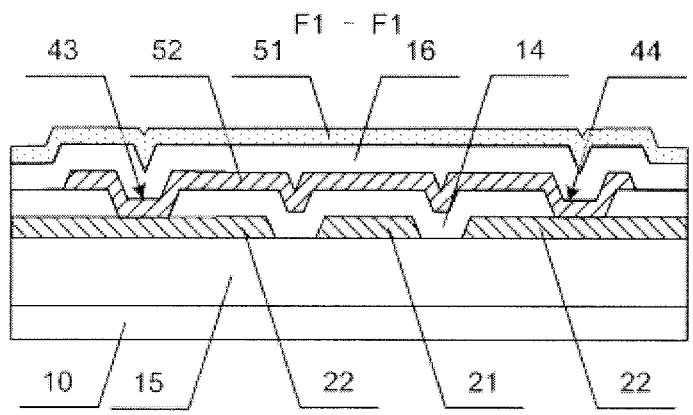

FIG. 39 and FIG. 40 are schematic views showing a third embodiment of a color filter substrate according to the invention. FIG. 39 corresponds to the sectional view taken along line D1-D1 in FIG. 23, and FIG. 40 corresponds to the sectional view taken along line F1-F1 in FIG. 23. As shown in FIG. 39 and FIG. 40, the structure and the operation principle of the color filter substrate in this embodiment is similar to those in the first embodiment, and the color filter substrate in this embodiment also comprises the touch structure layer and the color filter structure layer. However, in this embodiment, the color resin layer 15 is formed on the substrate 10, and the light-blocking layer 13, the first active layer 11 and the second active layer 12 are formed on the color resin layer 15. The channel region of the first piezoelectric switch is formed between the first electrode 31 and the first signal line 21, and the channel region of the second piezoelectric switch is formed between the second electrode 32 and the second signal line 22. The first insulating layer 14 is formed on the first signal line 21, the first electrode 31, the second signal line 22 and the second electrode 32. The third via hole 43 and the fourth via hole 44 are formed in the first insulating layer 14. The connection electrode 52 is formed on the first insulating layer 14 and is connected with the segments of the second signal line 22 through the third via hole 43 and the fourth via hole 44. The second insulating layer 16 is formed on the connection electrode 52 and on the first insulating layer 14 in the region other than that of the connection electrode 52. The first via hole 41 and the second via hole 42 are formed in the second insulating layer 16. The second insulating layer 16 and the first insulating layer 14 in the first via hole 41 are etched away to expose the surface of the first electrode 31, and the second insulating layer 16 and the first insulating layer 14 in the second via hole 42 are etched away to expose the surface of the second electrode 32. The working electrode 51 is formed on the second insulating layer 16. The working electrode 51 is connected with the first electrode 31 through the first via hole 41 and with the second electrode 32 through the second via hole 42. In this embodiment, the conductive thin film is a transparent conductive film, so that the working electrode 51 can be simultaneously used as the common electrode of the color filter structure layer.

It should be noted that the above embodiments of the color filter substrate intend not to limit the invention, and various modifications, alterations and combinations can be made depending on the practical requirements. In the first to third embodiments of the color filter substrate, the color filter substrate with the common electrode is illustrated. However, for the color filter substrate without the common electrode (such as the color filter substrate of the IPS or FFS thin film transistor liquid crystal display), the shape of the working electrode in the above three embodiments is changed and at this time the working electrode is no longer used as the common electrode simultaneously. In addition, the color filter substrate without the common electrode may be formed by combining the color filter resin layer and the above first and second embodiments of the touch screen. For example, the color resin layer is formed on the substrate, the first active layer and the second active layer are formed on the color resin layer, then the first signal line, the first electrode, the second signal line and the second electrode are formed, next the first insulating layer is formed, and finally the working electrode and the connection electrode are formed. In addition, in order to ensure the appropriate operation of the IPS or FFS thin film transistor liquid crystal display, the working electrode may be provided above the first signal line and the second signal line that are used as a block matrix.

A first embodiment of the method of manufacturing the color filter substrate according to the invention comprises the following steps:

Step 21 of sequentially depositing a first metal film and a piezoelectric film on a substrate and forming a first active layer and a second active layer by a patterning process, wherein a light-blocking layer is formed below the first active layer and the second active layer;

Step 22 of depositing a second metal film on the substrate after the Step 21 and forming a first signal line, a first electrode, a second signal line and a second electrode by a patterning process, wherein the first signal line integrally and continuously extends and is provided on the first active layer, the first electrode is also provided on the first active layer so that a channel region of a first piezoelectric switch is formed between the first electrode and the first signal line, the second signal line discontinuously extends and provided on the second active layer, two segments of the second signal line are formed on two sides of the first signal line, and the second electrode is also provided on the second active layer so that a channel region of a second piezoelectric switch is formed between the second electrode and the second signal line;

Step 23 of forming a color resin layer on the substrate after the Step 22 and forming a third via hole and a fourth via hole therein by a patterning process, wherein the third via hole and the fourth via hole are respectively provided at both end portions of each segment of the second signal line;

Step 24 of depositing a third metal film on the substrate after the Step 23 and forming a connection electrode by a patterning process, wherein the segments of the second signal line are connected with each other by the connection electrode through the third via hole and the fourth via hole;

Step 25 of depositing a first insulating layer on the substrate after the Step 24 and forming a first via hole and a second via hole therein by a patterning process, wherein the first via hole is provided over the first electrode, the first insulating layer and the color resin layer in the first via hole are etched away to expose the surface of the first electrode, the second via hole is provided over the second electrode, and the first insulating layer and the color resin layer in the second via hole are etched away to expose the surface of the second electrode;

Step 26 of depositing a conductive thin film on the substrate after the Step 25 and forming a working electrode by a patterning process, wherein the working electrode is connected with the first electrode through the first via hole and with the second electrode through the second via hole.

This method is applied to manufacture the structure in the first embodiment of the color filter substrate. In this embodiment, the conductive thin film may be a transparent conductive film, and the working electrode may be simultaneously used as the common electrode of the color filter structure layer. The process of this method has been described with reference to FIG. 23 to FIG. 36, and the details thereof are omitted here.

A second embodiment of the method of manufacturing the color filter substrate according to the invention comprises the following steps:

Step 31 of sequentially depositing a first metal film and a piezoelectric film on a substrate and forming a first active layer and a second active layer by a patterning process, wherein a light-blocking layer is formed below the first active layer and the second active layer;

Step 32 of depositing a second metal film on the substrate after the Step 31 and forming a first signal line, a first electrode, a second signal line and a second electrode by a patterning process, wherein the first signal line integrally and continuously extends and is provided on the first active layer, the first electrode is also provided on the first active layer so that a channel region of a first piezoelectric switch is formed between the first electrode and the first signal line, the second signal line discontinuously extends and is provided on the second active layer, two segments of the second signal line are formed on two sides of the first signal line, the second electrode is also provided on the second active layer so that a channel region of a second piezoelectric switch is formed between the second electrode and the second signal line;

Step 33 of depositing a first insulating layer on the substrate after the Step 32 and forming a third via hole and a fourth via hole therein by a patterning process, wherein the third via hole and the fourth via hole are respectively provided at both end portions of each segment of the second signal line;

Step 34 of depositing a third metal film on the substrate after the Step 33 and forming a connection electrode by a patterning process, wherein the segments of the second signal line are connected with each other by the connection electrode through the third via hole and the fourth via hole;

Step 35 of forming a color resin layer on the substrate after the Step 34 and forming a first via hole and a second via hole therein by a patterning process, wherein the first via hole is provided over the first electrode, the color resin layer and the first insulating layer in the first via hole are etched away to expose the surface of the first electrode, the second via hole is provided over the second electrode, and the color resin layer and the first insulating layer in the second via hole are etched away to expose the surface of the second electrode;

Step 36 of depositing a conductive thin film on the substrate after the Step 35, and forming a working electrode by a patterning process, wherein the working electrode is connected with the first electrode through the first via hole and with the second electrode through the second via hole.

This method is applied to manufacture the structure in the second embodiment of the color filter substrate. In this embodiment, the conductive thin film may be a transparent conductive film, and the working electrode may be simultaneously used as the common electrode of the color filter structure layer. The process of this method has been described with reference to FIG. 37 and FIG. 38, and the details thereof are omitted here.

A third embodiment of the method of manufacturing the color filter substrate according to the invention comprises the following steps:

Step 41 of forming a color resin layer on a substrate;

Step 42 of sequentially depositing a first metal film and a piezoelectric film on the substrate after the Step 41 and forming a first active layer and a second active layer by a patterning process, wherein a light-blocking layer is formed below the first active layer and the second active layer;

Step 43 of depositing a second metal film on the substrate after the Step 42 and forming a first signal line, a first electrode, a second signal line and a second electrode by a patterning process, wherein the first signal line integrally and continuously extends and is provided on the first active layer, the first electrode is also provided on the first active layer so that a channel region of a first piezoelectric switch is formed between the first electrode and the first signal line, the second signal line discontinuously extends and is provided on the second active layer, two segments of the second signal line are formed on two sides of the first signal line, the second electrode is also provided on the second active layer so that a channel region of a second piezoelectric switch is formed between the second electrode and the second signal line;

Step 44 of depositing a first insulating layer on the substrate after the Step 43 and forming a third via hole and a fourth via hole therein by a patterning process, wherein the third via hole and the fourth via hole are respectively provided at both end portions of each segment of the second signal line;

Step 45 of depositing a third metal film on the substrate after the Step 44 and forming a connection electrode by a patterning process, wherein the segments of the second signal line are connected with each other by the connection electrode through the third via hole and the fourth via hole;

Step 46 of depositing a second insulating layer on the substrate after the Step 45 and forming a first via hole and a second via hole therein by a patterning process, wherein the first via hole is provided over the first electrode, the second insulating layer and the first insulating layer in the first via hole are etched away to expose the surface of the first electrode, the second via hole is provided over the second electrode, and the second insulating layer and the first insulating layer in the second via hole are etched away to expose the surface of the second electrode;

Step 47 of depositing a conductive thin film on the substrate after the Step 46 and forming a working electrode by a patterning process, wherein the working electrode is connected with the first electrode through the first via hole and with the second electrode through the second via hole.

This method is applied to manufacture the structure in the third embodiment of the color filter substrate. In this embodiment, the conductive thin film may be a transparent conductive film, and the working electrode may be simultaneously used as the common electrode of the color filter structure layer. The process of this method has been described with reference to FIG. 39 and FIG. 40, and the details thereof are omitted here.

A fourth embodiment of the method of manufacturing the color filter substrate according to the invention comprises the following steps:

Step 51 of fowling a color resin layer on a substrate;

Step 52 of sequentially depositing a first metal film and a piezoelectric film on the substrate after the Step 51 and forming a first active layer and a second active layer by a patterning process, wherein a light-blocking layer is formed below the first active layer and the second active layer;

Step 53 of forming a first signal line, a first electrode, a second signal line and a second electrode on the substrate after the Step 52, wherein both the first signal line and the first electrode are connected with the first active layer, a channel region of a first piezoelectric switch is formed between the first electrode and the first signal line, both of the second signal line and the second electrode are connected with the second active layer, and a channel region of a second piezoelectric switch is formed between the second electrode and the second signal line;

Step 54 of depositing an insulating layer on the substrate after the Step 53 and forming a first via hole and a second via hole therein by a patterning process, wherein the first via hole is provided over the first electrode, and the second via hole is provided over the second electrode;

Step 55 of depositing a conductive thin film on the substrate after the Step 54, and forming a working electrode by a patterning process, wherein the working electrode is connected with the first electrode through the first via hole and with the second electrode through the second via hole.

This method is a combination of those manufacturing the color filter structure layer and the touch screen that is described previously. In this embodiment, the conductive thin film may be a transparent conductive film, and the working electrode may be simultaneously used as the common electrode of the color filter structure layer. The process of this method has been described above, and the details thereof are omitted here.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A touch screen comprising a substrate, a plurality of touch regions defined by a plurality of first signal lines and a plurality of second signal lines being provided on the substrate, wherein in each touch region, the first signal line is connected with a first piezoelectric switch, the second signal line is connected with a second piezoelectric switch, the first piezoelectric switch is a transistor type switch and comprises a first active layer, a first source electrode and a first drain electrode, the second piezoelectric switch is a transistor type switch and comprises a second active layer, a second source electrode and a second drain electrode;

when the touch region is touched by a force, the first piezoelectric switch and the second piezoelectric switch are turned on and transfer voltage signals respectively via the first signal line and the second signal line to determine the coordinate of the touched touch region;

the touch screen further comprises a first electrode and a second electrode;

the first active layer is formed by a piezoelectric film and provided in the touch region, the first signal line is used as the first source electrode, the first electrode is used as the first drain electrode and provides a working voltage, the first signal line and the first electrode are respectively connected with the first active layer, and a channel region of the first piezoelectric switch is formed between the first signal line and the first electrode;

the second active layer is formed by a piezoelectric film and provided in the touch region, the second signal line is used as the second source electrode, the second electrode is used as the second drain electrode and provides the working voltage, the second signal line and the second electrode are respectively connected with the second active layer, and a channel region of the second piezoelectric switch is formed between the second signal line and the second electrode; and the first signal line and the first electrode are provided on the first active layer, a first insulating layer is formed on the first signal line and the first electrode, a fifth via hole and a sixth via hole are provided in the first insulating layer, the second electrode and the second signal line are provided on the first insulating layer and are connected with the second active layer respectively by the fifth via hole and the sixth via hole, a second insulating layer is formed on the second electrode and the second signal line, a first via hole and a second via hole are provided in the second insulating layer, the first via hole further passes through the first insulating layer to expose the surface of the first electrode, a working electrode for providing the working voltage is formed on the second insulating layer and is connected with the first electrode through the first via hole and with the second electrode through the second via hole.

2. The touch screen according to claim 1, wherein a light-blocking layer is further provided below the first active layer and the second active layer.

3. A color filter substrate comprising: a substrate, a color filter structure layer and a touch structure layer for determining the coordinate of a touch point, which are provided on the substrate, the touch structure layer comprising a plurality of first signal lines and a plurality of second signal lines for defining a plurality of pixel regions, wherein in each of the pixel regions, the first signal line is connected with a first piezoelectric switch, the second signal line is connected with a second piezoelectric switch, the first piezoelectric switch is a transistor type switch and comprises a first active layer, a first source electrode and a first drain electrode, the second piezoelectric switch is a transistor type switch and comprises a second active layer, a second source electrode and a second drain electrode;

when the pixel region is touched by a force, the first piezoelectric switch and the second piezoelectric switch are turned on and transfer voltage signals respectively via the first signal line and the second signal line to determine the coordinate of the touched pixel region;

the touch screen further comprises a first electrode and a second electrode;

the first active layer is formed by a piezoelectric film and provided in the pixel region, the first signal line is used as the first source electrode, the first electrode is used as the first drain electrode and provides a working voltage, the first signal line and the first electrode are respectively connected with the first active layer, and a channel region of the first piezoelectric switch is formed between the first signal line and the first electrode;

the second active layer is formed by a piezoelectric film and provided in the pixel region, the second signal line is used as the second source electrode, the second electrode is used as the second drain electrode and provides the working voltage, the second signal line and the second electrode are respectively connected with the second active layer, and a channel region of the second piezoelectric switch is formed between the second signal line and the second electrode;

a color resin layer is provided on the substrate, the first active layer and the second active layer are formed on the color resin layer;

the first signal line integrally and continuously extends, the second signal line discontinuously extends, two segments of the second signal line are formed on two sides of the first signal line, the segments of the second signal line are connected with each other by a connection electrode; or the second signal line integrally and continuously extends, the first signal line discontinuously extends, two segments of the first signal line are formed on two sides of the second signal line, the segments of the first signal line are connected with each other by a connection electrode;

a first insulating layer is provided on the first signal line and the second signal line, the connection electrode is formed on the first insulating layer, a third via hole and a fourth via hole are provided in the first insulating layer, the segments of the second signal line or the first signal line are connected with each other by the connection electrode through the third via hole and the fourth via hole; and a second insulating layer is formed on the connection electrode, a first via hole is provided above the first electrode, the first insulating layer and the second insulating layer in the first via hole are removed to expose the surface of the first electrode, a second via hole is provided above the second electrode, the first insulating layer and the second insulating layer in the second via hole are removed to expose the surface of the second electrode, a working electrode for providing the working voltage is formed on the second insulating layer, and is connected with the first electrode through the first via hole and is connected with the second electrode through the second via hole.

4. The color filter substrate according to claim 3, wherein the working electrode is simultaneously used as a common electrode of the color filter structure layer.

5. The color filter substrate according to claim 3, wherein a light-blocking layer is further provided below the first active layer and the second active layer.

6. A touch screen comprising a substrate, a plurality of touch regions defined by a plurality of first signal lines and a plurality of second signal lines being provided on the substrate, wherein in each touch region, the first signal line is connected with a first piezoelectric switch, the second signal line is connected with a second piezoelectric switch, the first piezoelectric switch is a transistor type switch and comprises a first active layer, a first source electrode and a first drain electrode, the second piezoelectric switch is a transistor type switch and comprises a second active layer, a second source electrode and a second drain electrode;

when the touch region is touched by a force, the first piezoelectric switch and the second piezoelectric switch are turned on and transfer voltage signals respectively via the first signal line and the second signal line to determine the coordinate of the touched touch region;

the touch screen further comprises a first electrode and a second electrode;

the first active layer is formed by a piezoelectric film and provided in the touch region, the first signal line is used as the first source electrode, the first electrode is used as the first drain electrode and provides a working voltage, the first signal line and the first electrode are respectively connected with the first active layer, and a channel region of the first piezoelectric switch is formed between the first signal line and the first electrode;

the second active layer is formed by a piezoelectric film and provided in the touch region, the second signal line is used as the second source electrode, the second electrode is used as the second drain electrode and provides the working voltage, the second signal line and the second electrode are respectively connected with the second active layer, and a channel region of the second piezoelectric switch is formed between the second signal line and the second electrode; and a light-blocking layer is further provided below the first active layer and the second active layer and prevents light from entering into the first active layer and the second active layer.

7. The touch screen according to claim 6, wherein the first signal line and the first electrode are provided on the first active layer, the second signal line and the second electrode are provided on the second active layer, a first insulating layer is formed on the first signal line, the first electrode, the second signal line and the second electrode, a first via hole and a second via hole are formed in the insulating layer, the first via hole is provided over the first electrode, the second via hole is provided over the second electrode, a working electrode for providing the working voltage is formed on the first insulating layer and is connected with the first electrode through the first via hole and with the second electrode through the second via hole.

8. The touch screen according to claim 7, wherein the first signal line integrally and continuously extends, the second signal line discontinuously extends, two segments of the second signal line are formed on two sides of the first signal line, the segments of the second signal line are connected with each other by a connection electrode; or the second signal line integrally and continuously extends, the first signal line discontinuously extends, two segments of the first signal line are formed on two sides of the second signal line, the segments of the first signal line are connected with each other by a connection electrode.

9. The touch screen according to claim 8, wherein the connection electrode is formed on the first insulating layer, a third via hole and a fourth via hole are provided in the first insulating layer, the segments of the second signal line or the first signal line are connected with each other by the connection electrode through the third via hole and the fourth via hole.

10. The touch screen according to claim 6, wherein the first signal line and the first electrode are provided on the first active layer, a first insulating layer is formed on the first signal line and the first electrode, a fifth via hole and a sixth via hole are provided in the first insulating layer, the second electrode and the second signal line are provided on the first insulating layer and are connected with the second active layer respectively by the fifth via hole and the sixth via hole, a second insulating layer is formed on the second electrode and the second signal line, a first via hole and a second via hole are provided in the second insulating layer, the first via hole further passes through the first insulating layer to expose the surface of the first electrode, a working electrode for providing the working voltage is formed on the second insulating layer and is connected with the first electrode through the first via hole and with the second electrode through the second via hole.

* * * * *